US008724956B2

(12) United States Patent
Wu et al.

(10) Patent No.: US 8,724,956 B2
(45) Date of Patent: May 13, 2014

(54) D1451 RADIATION CURABLE SUPERCOATINGS FOR MULTI-MODE OPTICAL FIBER

(71) Applicant: DSM IP Assets B.V., Heerlen (NL)

(72) Inventors: Xiaosong Wu, Geneva, IL (US); Steven Robert Schmid, East Dundee, IL (US); Timothy Edward Bishop, Algonquin, IL (US); John Monroe Zimmerman, Crystal Lake, IL (US); Wendell Wayne Cattron, Iron Station, NC (US); Edward Joseph Murphy, Arlington Heights, IL (US); Pratik Shah, Barlett, IL (US)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 13/797,935

(22) Filed: Mar. 12, 2013

(65) Prior Publication Data
US 2014/0064692 A1 Mar. 6, 2014

Related U.S. Application Data

(63) Continuation of application No. 13/388,726, filed as application No. PCT/US2010/002720 on Oct. 8, 2010.

(60) Provisional application No. 61/272,596, filed on Oct. 9, 2009, provisional application No. 61/250,329, filed on Oct. 9, 2009, provisional application No. 61/287,567, filed on Dec. 17, 2009, provisional application No. 61/363,965, filed on Jul. 13, 2010.

(51) Int. Cl.
*G02B 6/00* (2006.01)

(52) U.S. Cl.
USPC ............... 385/141; 428/375; 65/430; 65/529; 427/162; 427/163.2; 427/487; 427/508; 427/558; 522/25; 522/28; 522/64; 522/11; 118/600; 118/642; 118/620; 524/1; 156/275.5; 156/315; 250/492.1; 264/1.24; 264/1.27; 523/1; 528/10; 528/44

(58) Field of Classification Search
USPC ............. 385/141, 123, 128; 428/375; 65/430, 65/529; 427/162, 163.2, 487, 508, 558; 522/25, 28, 64, 11; 118/600, 620, 642; 524/1; 156/275.5, 315; 250/492.1; 264/1.24, 1.27; 523/1; 528/10, 44
See application file for complete search history.

(56) References Cited

U.S. PATENT DOCUMENTS

| 6,197,422 B1 | 3/2001 | Murphy et al. |
| 6,246,824 B1 | 6/2001 | Vandeberg et al. |

(Continued)

FOREIGN PATENT DOCUMENTS

| EP | 0 980 343 B1 | 5/1998 |
| EP | 1 452 501 A1 | 9/2004 |

(Continued)

OTHER PUBLICATIONS

International Search Report for PCT/US2010/002720, mailed May 2, 2011.

(Continued)

*Primary Examiner* — Peter Radkowski
(74) *Attorney, Agent, or Firm* — Nixon & Vanderhye P.C.

(57) ABSTRACT

The first aspect of the instant claimed invention is a method of formulating radiation curable Supercoatings for application to an optical fiber used in a telecommunications network. A Multi-layer Film Drawdown Method useful in the Method of formulating radiation curable Supercoatings is also described and claimed. Single mode Optical fibers coated with specific radiation curable Supercoatings are also described and claimed.

1 Claim, 13 Drawing Sheets

Comparative Example

(56) References Cited

U.S. PATENT DOCUMENTS

| | | | |
|---|---|---|---|
| 6,298,189 | B1 | 10/2001 | Szum et al. |
| 6,775,451 | B1 | 8/2004 | Botelho et al. |
| 2004/0013382 | A1 | 1/2004 | Van Eekelen et al. |
| 2005/0207715 | A1 | 9/2005 | Roba et al. |
| 2008/0226909 | A1* | 9/2008 | Schmid et al. ............... 428/375 |
| 2008/0226912 | A1 | 9/2008 | Norlin et al. |
| 2008/0226913 | A1 | 9/2008 | Cattron et al. |

FOREIGN PATENT DOCUMENTS

| | | |
|---|---|---|
| EP | 2 479 155 A1 | 10/2010 |
| EP | 2 479 156 A1 | 10/2010 |
| EP | 2 484 647 A1 | 10/2010 |
| JP | 2001-502653 | 2/2001 |
| JP | 2001-524223 | 11/2001 |
| WO | WO01/83384 | 11/2001 |
| WO | WO01/84162 | 11/2001 |
| WO | WO2008/076298 | 6/2008 |
| WO | WO 2011/043825 A3 | 4/2011 |

OTHER PUBLICATIONS

International Preliminary Report on Patentability and Written Opinion from PCT with Issuance Date of Apr. 11, 2012 in connection with International Application No. PCT/US2010/002720; 10 pgs.

European Search Report dated Jun. 27, 2012 issued in European Application No. 12162207.0; 5 pages.

European Search Report dated Jun. 27, 2012 issued in European Application No. 12162213.8; 5 pages.

European Search Report dated Jul. 5, 2012 issued in European Application No. 12162235.1; 5 pages.

Office Action in related Korean Application No. 2012-7008622; dated Sep. 5, 2013; in Korean with English Translation; 7 pages.

Office Action in related Japanese Application No. 2012-523611; Dispatch Date Oct. 22, 2013; In Japanese with English Translation; 10 pages.

Decision to Grant in related Russian Application No. 2012112926/03 dated Sep. 3, 2013; In Russian with English Translation; 12 pages.

Communication pursuant to Article 94(3) EPC in related EPO Application No. 10 768 627.1 dated Sep. 27, 2013; 6 pages.

Communication pursuant to Article 94(3) EPC in related EPO Application No. 12 162 207.0 dated Sep. 27, 2013; 3 pages.

Intention to Grant in related EPO Application No. 12 162 207.0; Communication under Rule 71(3) EPC; dated Nov. 7, 2013; 92 pages.

Office Action in related U.S. Appl. No. 13/388,726; Notification Date of May 23, 2013; 15 pages.

Office Action in related U.S. Appl. No. 13/388,726; Notification Date of Jul. 30, 2013; 17 pages.

Office Action in related U.S. Appl. No. 13/797,866; Notification Date of Sep. 12, 2013; 8 pages.

Office Action in related U.S. Appl. No. 13/797,908; Notification Date of Jun. 28, 2013; 10 pages.

Office Action of related Chinese Patent Application No. 201080034768.0; Issue Date Jan. 3, 2014; In Chinese with English Translation; 13 pages.

Office Action in related U.S. Appl. No. 13/797,866; Notification Date of Jan. 27, 2014; 17 pgs.

Office Action in related U.S. Appl. No. 13/797,908; Notification Date of Jan. 16, 2014, 2013; 9 pgs.

* cited by examiner

Comparative Example

Comparative Example

Comparative Example

Comparative Example

D1451 RADIATION CURABLE SUPERCOATINGS FOR MULTI-MODE OPTICAL FIBER

RELATED PATENT APPLICATIONS

This is a continuation of U.S. application Ser. No. 13/388,726, filed on Feb. 3, 2012, which is the U.S. national phase of International Application No. PCT/US2010/002720, filed 8 Oct. 2010, which designated the U.S. and claims the benefit of priority to U.S. Provisional Patent Application No. 61/272,596, filed Oct. 9, 2009; U.S. Provisional Patent Application No. 61/250,329, filed Oct. 9, 2009; U.S. Provisional Patent Application No. 61/287,567, filed Dec. 17, 2009; and U.S. Provisional Patent Application No. 61/363,965, filed Jul. 13, 2010; the entire contents of each of which are hereby incorporated by reference.

FIELD OF THE INVENTION

The present invention relates to radiation curable coatings for optical fiber.

BACKGROUND OF THE INVENTION

An optical fiber is a glass fiber that carries light along its length. Optical fibers are widely used in fiber-optic communications, which permits transmission over longer distances and at higher bandwidths (data rates) than other forms of communications. Fibers are used instead of metal wires because signals travel along them with less loss, and they are also immune to electromagnetic interference.

Light is kept in the core of the optical fiber by total internal reflection. This causes the fiber to act as a waveguide. Fibers which support many propagation paths or transverse modes are called multi-mode fibers (MMF), while those which can only support a single mode are called single-mode fibers (SMF). MMF generally have a larger core diameter, and are used for short-distance communication links and for applications where high power must be transmitted. SMF are used for most communication links longer than 550 meters (1,800 ft).

Throughout this patent application, attenuation in fiber optics, also known as transmission loss, is defined as the reduction in intensity of the light beam (or signal) with respect to distance traveled through a transmission medium. Attenuation loss coefficients in optical fibers usually are reported using units of decibels per kilometer, abbreviated dB/km.

Attenuation is an important factor limiting the transmission of a digital signal across large distances. Thus, much research has gone into both limiting the attenuation and maximizing the amplification of the optical signal. Empirical research has shown that attenuation in optical fiber is caused primarily by both scattering and absorption.

In 1965, Charles K. Kao {one of three winners of the 2009 Nobel Prize in physics for "groundbreaking achievements concerning the transmission of light in fibers for optical communication"} and George A. Hockham of the British company Standard Telephones and Cables (STC) were the first to promote the idea that the attenuation in optical fibers could be reduced below 20 decibels per kilometer (dB/km), allowing optical fibers to be a practical medium for communication. They proposed that the attenuation in fibers available at the time was caused by impurities, which could be removed, rather than fundamental physical effects such as scattering. The crucial attenuation level of 20 dB/km was first achieved in 1970, by researchers Robert D. Maurer, Donald Keck, Peter C. Schultz, and Frank Zimar working for American glass maker Corning Glass Works, now Corning Incorporated. They demonstrated a fiber with 17 dB/km attenuation by doping silica glass with titanium. A few years later they produced a fiber with only 4 dB/km attenuation using germanium dioxide as the core dopant. The achievement of such low attenuations ushered in optical fiber telecommunications and enabled the internet.

The following U.S. patent is incorporated by reference in its entirety: U.S. Pat. No. 6,014,488 issued on Jan. 11, 2000.

Microbends are sharp but microscopic curvatures in an optical fiber involving local axial displacements of a few micrometers and spatial wavelengths of a few millimeters. Microbends can be induced by thermal stresses and/or mechanical lateral forces. When present, microbends attenuate the signal transmission capability of the coated optical fiber. Thus for the success of a telecommunications network it is known each telecommunications system has a limit to the amount of tolerable increase in attenuation for optical fiber and that to avoid reaching that limit it is well to reduce microbending overall because reducing microbending, reduces the increase in attenuation.

One of the critical driving forces for the development of optical fiber coating technology is increased user demands on videos. For the existing technology of optical fiber coating, 2G network application is sufficient. However, the future networks, such as 3G, 4G, and IPTV, high definition television (HDTV), video conferencing and other high bandwidth applications will impose a higher requirement for the performance of optical fiber, therefore the requirement of performance of the optical fiber coating will become higher and higher.

In order to meet the huge demand of video applications on the internet, the telecommunication network of next generation requires the support of transmission of greater capacity, longer distance and broader spectral range, and the performance of the current generation of optical fibers G652 was developed for long haul straight alignment utility; therefore G562 is not suitable to meet the requirements of Fiber to the Home (FTTH) challenges.

As optical transport of communication signals migrates into homes and MDU's (Multiple Dwelling Units), optical glass fibers are encountering tighter bends, requiring optical fiber producers to offer G657 Macrobend resistant fibers. At the same time, increasing demands for bandwidth are putting strains on the available margin in deployed networks.

The first generation of radiation curable DeSolite Radiation curable Supercoatings™ (trademark of DSM IP Assets B.V.) for optical fiber are described and claimed in these U.S. Patent Applications, which are hereby incorporated by reference in their entirety: U.S. patent application Ser. No. 11/955,935, filed Dec. 13, 2007, published as US 20080226916 on Sep. 19, 2008; U.S. patent application Ser. No. 11/955,838, filed Dec. 13, 2007, published as US 20080241535 on Oct. 23, 2008; U.S. patent application Ser. No. 11/955,547, filed Dec. 13, 2007, published as US 20080226912 on Sep. 19, 2008; U.S. patent application Ser. No. 11/955,614, filed Dec. 13, 2007, published as US 20080226914 on Sep. 19, 2008; U.S. patent application Ser. No. 11/955,604, filed Dec. 13, 2007, published as US 20080226913 on Sep. 19, 2008; U.S. patent application Ser. No. 11/955,721, filed Dec. 13, 2007, published as US 20080233397 on Sep. 25, 2008; U.S. patent application Ser. No. 11/955,525, filed Dec. 13, 2007, published as US 20080226911 on Sep. 19, 2008; U.S. patent application Ser. No. 11/955,628, filed Dec. 13, 2007, published as US 20080226915 on Sep. 19, 2008; and U.S. patent application Ser. No. 11/955,541, filed Dec. 13, 2007, published as US 20080226909 on Sep. 19, 2008.

U.S. patent application Ser. No. 11/955,541, filed Dec. 13, 2007, published on Sep. 18, 2009 as US Published Patent Application 20080226909, entitled "D1381 RADIATION CURABLE SUPERCOATINGS FOR OPTICAL FIBER" describes and claims Radiation Curable Supercoatings for Optical Fiber as follows:

Supercoatings suitable for coating an optical fiber;
wherein the Supercoatings comprise at least two layers, wherein the first layer is a Primary Coating that is in contact with the outer surface of the optical fiber and the second layer is a Secondary Coating in contact with the outer surface of the Primary Coating,
wherein the cured Primary Coating on the optical fiber has the following properties after initial cure and after one month aging at 85° C. and 85% relative humidity:
A) a % RAU of from about 84% to about 99%;
B) an in-situ modulus of between about 0.15 MPa and about 0.60 MPa; and
C) a Tube Tg, of from about −25° C. to about −55° C.;
wherein the cured Secondary Coating on the optical fiber has the following properties after initial cure and after one month aging at 85° C. and 85% relative humidity:
A) a % RAU of from about 80% to about 98%;
B) an in-situ modulus of between about 0.60 GPa and about 1.90 GPa; and
C) a Tube Tg, of from about 50° C. to about 80° C.

With the recent launch of the DeSolite Supercoatings™ line of Radiation curable Supercoatings for optical fiber, by DSM Desotech, see www.Supercoatines.com it has been reported that use of Supercoatings has great positive effect upon the microbending characteristics of the optical fiber. Thus using Supercoatings is known to reduce the amount of microbending in an optical fiber and reducing the amount of microbending reduces the amount of attenuation in the telecommunications network As the demand for ever increasing bandwidth develops in the internet and current telecommunications devices, the demand for optical fiber that is attenuation resistant will also increase. Thus the demand for radiation curable Supercoatings will increase. As the demand for attenuation resistant optical fiber and radiation curable Supercoatings increases it would be desirable to have a method for selecting and formulating radiation curable Supercoatings for optical fiber.

SUMMARY OF THE INVENTION

The first aspect of the instant claimed invention is a method of formulating radiation curable Supercoatings for application to an optical fiber used in a telecommunications network, wherein said Supercoatings comprise at least two layers, the first layer being a primary coating that is in contact with the outer layer surface of the optical fiber and the second layer being a secondary coating in contact with the outer surface of the primary coating, wherein the cured primary coating on the optical fiber has the following properties after initial cure and after at least one month aging at 85° C. and 85% relative humidity:
1) a % RAU of from about 84% to about 99%;
2) an in-situ modulus of between about 0.15 MPa and about 0.60 MPa; and
3) a Tube T, of from about −25° C. to about −55° C.;
and wherein the cured secondary coating on the optical fiber has the following properties after initial cure and after at least one month aging at 85° C. and 85% relative humidity:
4) a % RAU of from about 80% to about 98%;
5) an in-situ modulus of between about 0.060 GPa and about 1.90 GPa; and
6) a Tube $T_g$ of from about 50° C. to about 80° C.;
said method comprising the steps of:
a) determining the Maximum Acceptable Increase in Attenuation requirements for the telecommunications network where the optical fiber will be installed;
b) determining a Field Application Environment of the Supercoatings comprising:
   i) selecting the type of glass being used in the optical fiber;
   ii) deciding whether the secondary coating of the Supercoatings will be applied over the primary coating of the Supercoatings wet-on-dry or wet-on-wet;
   iii) selecting the type, number of lights and positioning of lights along a draw tower manufacturing line that are used to cure the Supercoatings on the optical fiber; and
   iv) selecting the line speed at which the Supercoatings will be applied;
c) formulating a primary coating composition in a liquid, uncured state;
d) formulating a secondary coating composition in a liquid, uncured state;
e) using a Three-Dimensional Laced Methodology, as shown in FIGS. 2, 3 and 4, of
   i) testing the primary coating and secondary coating of the Supercoatings to determine if the Supercoatings parameters 1) through 6) are achieved; wherein
      if each and every one of the Supercoatings parameters 1) through 6) are achieved then proceed to step f); and
      if each and every one of the Supercoatings parameters 1) through 6) have not been achieved, reformulate either or both of the primary coating or secondary coating of the Supercoatings and repeat step ii) until each and every one of the Supercoatings parameters 1) through 6) are achieved; and then
   ii) verifying the integrity of the reformulation of the primary coating and the secondary coating of the Supercoatings by evaluating changes in each formulation relative to the other formulation and relative to all of the Supercoatings parameters 1) through 6);
f) using the results from step e)i) and step e)ii) to finalize the selection of Supercoatings to achieve the Maximum Acceptable Increase in Attenuation of the coated optical fiber.

The second aspect of the instant claimed invention is the Method of the first aspect, in which the Three-Dimensional Laced Methodology includes using a Multi-Layer Film Drawdown method to evaluate composite fused Primary Coating Layer and Secondary Coating Layer of Radiation curable Supercoatings.

The third aspect of the instant claimed invention is a Multi-Layer Film Drawdown Method comprising the steps of:
a) selecting a substrate for the test;
b) applying a Primary coating to the substrate using a defined thickness drawdown bar;
c) optionally curing the Primary coating;
d) applying a Secondary coating to the Primary coating using a defined thickness drawdown bar, wherein the defined thickness of the drawdown bar to apply the Secondary coating is greater than the defined thickness of the drawdown bar used to apply the primary coating;
e) applying radiation to the multi-layer film sufficient to effectuate the cure of both the Primary and Secondary into a Fused Composite film;
f) removing the film from the substrate; and
g) evaluating the functional properties of the cured film.

The fourth aspect of the instant claimed invention is a single-mode optical fiber coated with Supercoatings, wherein said Supercoatings comprise,
a Primary Coating Layer and a Secondary Coating Layer;
wherein the composition of the Primary Coating layer, prior to curing, is selected from the group consisting of the formulations of Examples 1PA2, 1PB3, 1PC1, 1PD5, 2Alpha, and 2Beta;
wherein the composition of the Secondary Coating layer, prior to curing, is selected from the group
consisting of the formulations of Examples 2SA4 and 2SB3 and 3SA1 and 5SA1.

The fifth aspect of the instant claimed invention is a multi-mode optical fiber coated with radiation curable coatings comprising a Primary Coating Layer and a Secondary Coating Layer
wherein the composition of the Primary Coating layer, prior to curing, is selected from the group
consisting of the formulation of Example 1PD5; and
wherein the composition of the Secondary Coating layer, prior to curing, is selected from the group
consisting of the formulations of Examples 2SA4 and 2SB3 and 3SA1 and 5SA1.

DETAILED DESCRIPTION OF THE INVENTION

Figure 2:
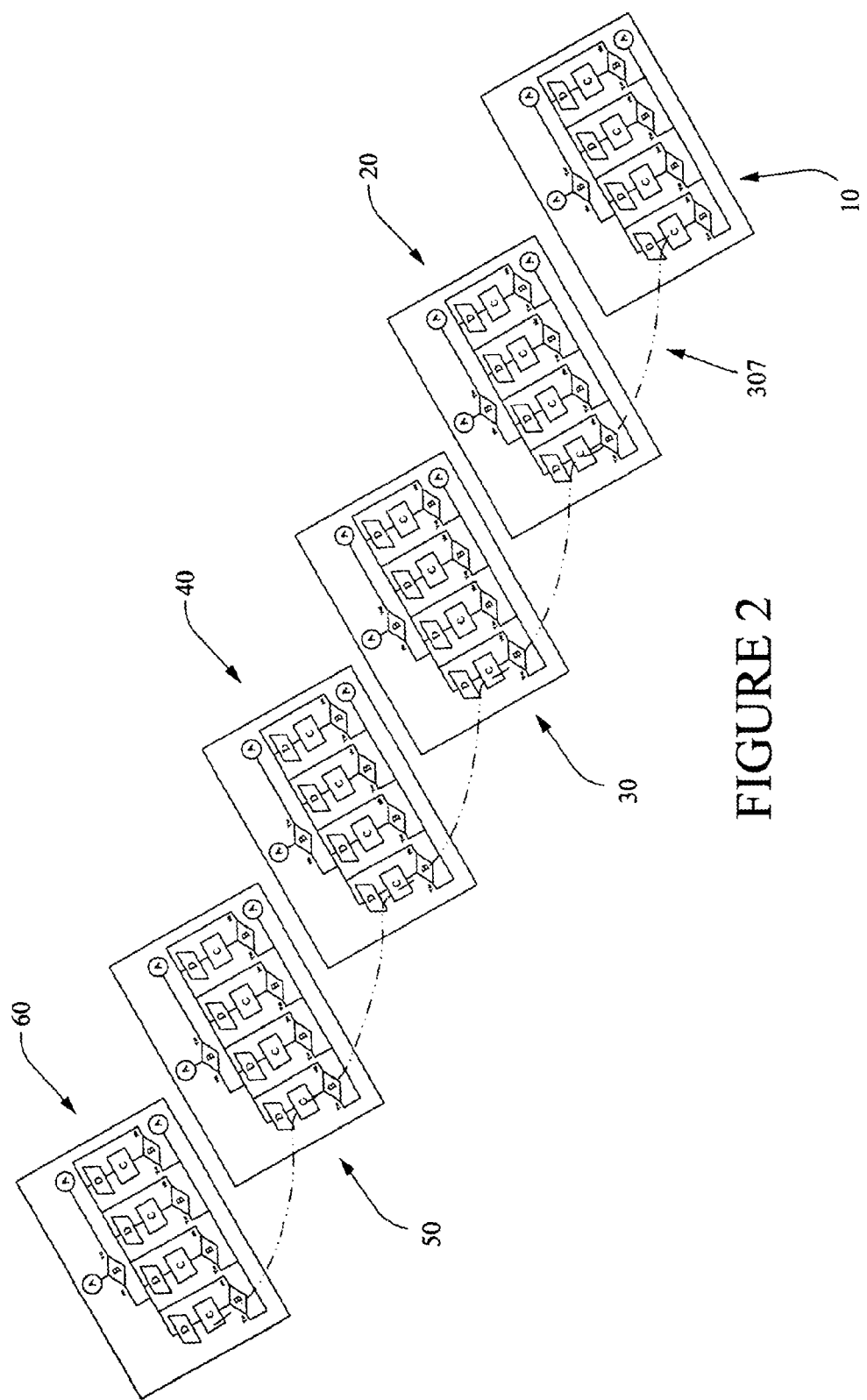
FIG. 2 is the first embodiment illustrating the three-dimensional laced methodology for formulating radiation curable Supercoatings for Optical Fiber.
Figure 3:
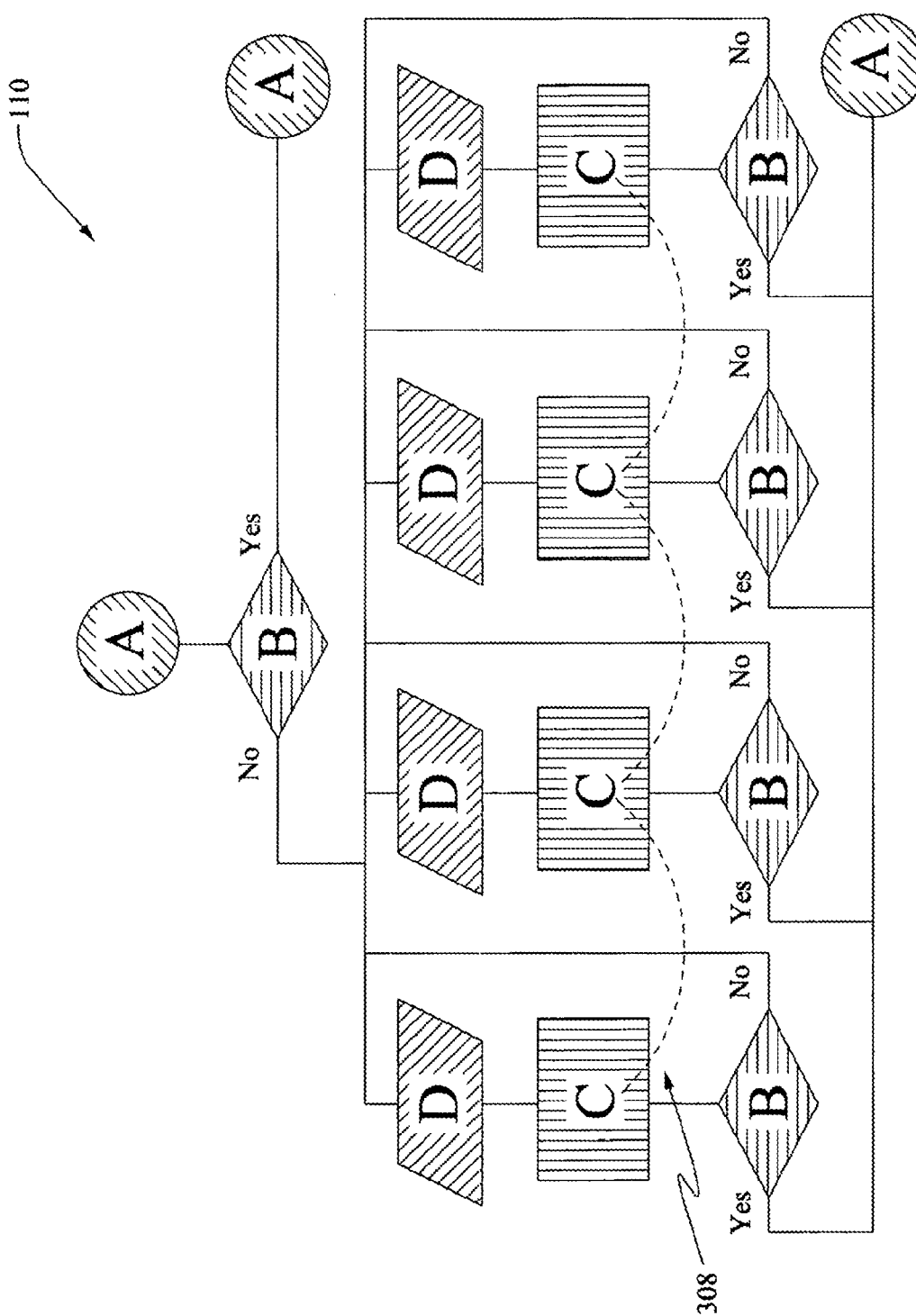
FIG. 3 is the second embodiment illustrating the three-dimensional laced methodology for formulating radiation curable Supercoatings for Optical Fiber.
Figure 4:
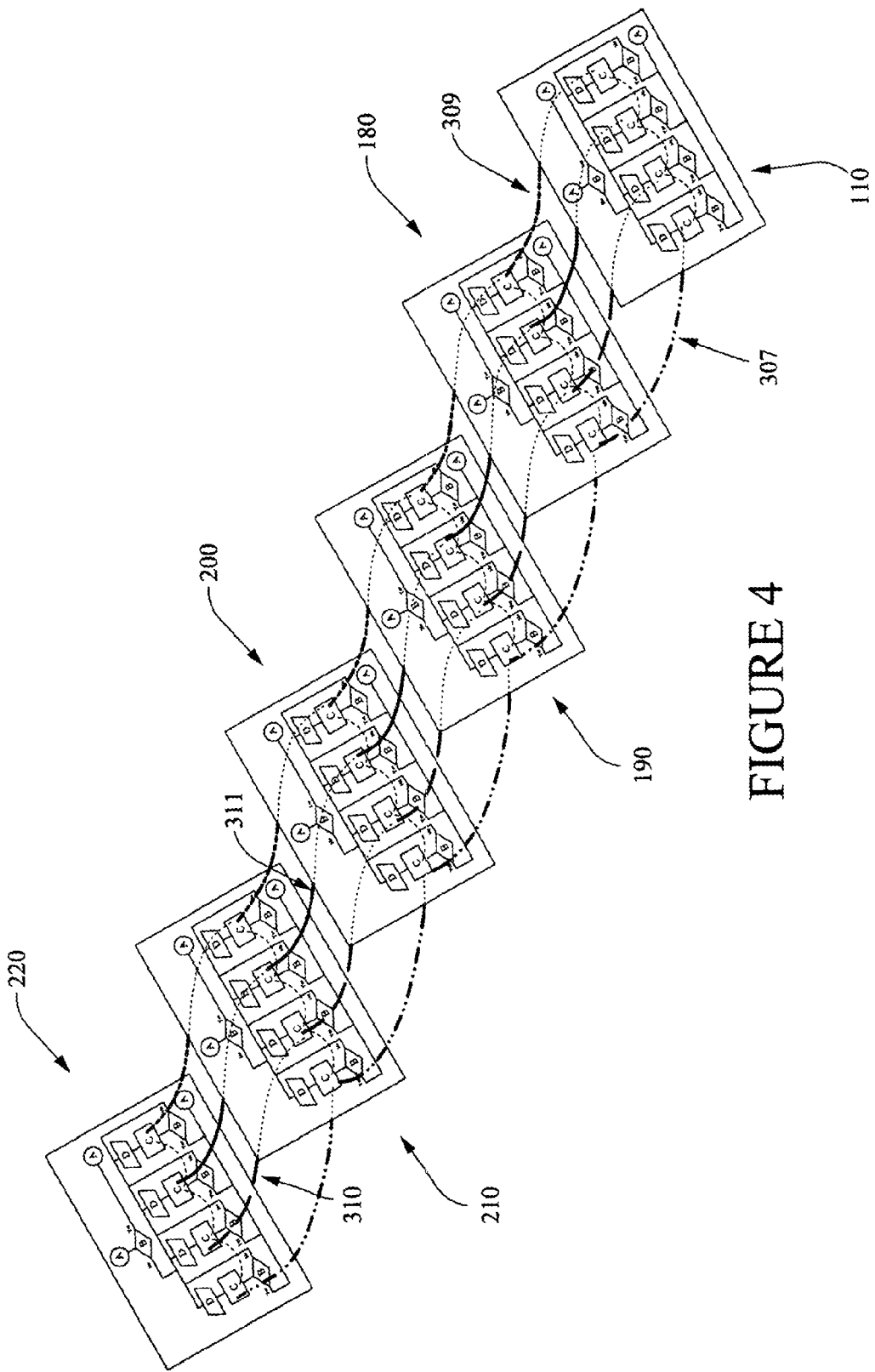
FIG. 4 is the third embodiment illustrating the three-dimensional laced methodology for formulating radiation curable Supercoatings for Optical Fiber.

The first aspect of the instant claimed invention is a method of formulating radiation curable Supercoatings for application to an optical fiber used in a telecommunications network, wherein said Supercoatings comprise at least two layers, the first layer being a primary coating that is in contact with the outer layer surface of the optical fiber and the second layer being a secondary coating in contact with the outer surface of the primary coating, wherein the cured primary coating on the optical fiber has the following properties after initial cure and after at least one month aging at 85° C. and 85% relative humidity:
1) a % RAU of from about 84% to about 99%;
2) an in-situ modulus of between about 0.15 MPa and about 0.60 MPa; and
3) a Tube $T_g$, of from about −25° C. to about −55° C.;
and wherein the cured secondary coating on the optical fiber has the following properties after initial cure and after at least one month aging at 85° C. and 85% relative humidity:
4) a % RAU of from about 80% to about 98%;
5) an in-situ modulus of between about 0.060 GPa and about 1.90 GPa; and
6) a Tube $T_g$ of from about 50° C. to about 80° C.;
said method comprising the steps of:
a) determining the Maximum Acceptable Increase in Attenuation requirements for the telecommunications network where the optical fiber will be installed;
b) determining a Field Application Environment of the Supercoatings comprising:
i) selecting the type of glass being used in the optical fiber;
ii) deciding whether the secondary coating of the Supercoatings will be applied over the primary coating of the Supercoatings wet-on-dry or wet-on-wet;
iii) selecting the type, number of lights and positioning of lights along a draw tower manufacturing line that are used to cure the Supercoatings on the optical fiber; and
iv) selecting the line speed at which the Supercoatings will be applied;
c) formulating a primary coating composition in a liquid, uncured state;
d) formulating a secondary coating composition in a liquid, uncured state;
e) using a Three-Dimensional Laced Methodology, as shown in FIGS. 2, 3 and 4, of
i) testing the primary coating and secondary coating of the Supercoatings to determine if the Supercoatings parameters 1) through 6) are achieved; wherein
if each and every one of the Supercoatings parameters 1) through 6) are achieved then proceed to step f); and
if each and every one of the Supercoatings parameters 1) through 6) have not been achieved, reformulate either or both of the primary coating or secondary coating of the Supercoatings and repeat step ii) until each and every one of the Supercoatings parameters 1) through 6) are achieved; and then ii) verifying the integrity of the reformulation of the primary coating and the secondary coating of the Supercoatings by evaluating changes in each formulation relative to the other formulation and relative to all of the Supercoatings parameters 1) through 6);

f) using the results from step e)i) and step e)ii) to finalize the selection of Supercoatings to achieve the Maximum Acceptable Increase in Attenuation of the coated optical fiber.

The first step in the process is determining the Maximum Acceptable Increase in Attenuation requirements for the telecommunications network where the optical fiber will be installed. Determining the attenuation requirements for the telecommunications network involves the design criteria for the Optical Fiber Network. Some considerations in the design include: an understanding of how much of the network is straight line installation of multi-mode optical fiber as compared to how much of the network is Fiber-to-the-Home (abbreviated FFTH) installation of single mode optical fiber. There are many other design criteria for an Optical Fiber network that are known to people of ordinary skill in the art of designing Optical Fiber Networks.

Specific Considerations in design of Optical Fiber Networks include the following It is currently known, that in contrast to traditional straight line optical fiber long haul networks, that FTTH applications have to work at least at three wavelengths:

1310 nm (data/voice upstream)
1490 nm (data/voice downstream)
1550 nm (video signal).

Traditional optical fiber networks used Standard single mode wavelengths of between 1310 nm and 1550 nm, with the wavelength of 1625 nm being available for testing of the system. Now, with the increasing demand for signal transmission it is anticipated that future optical fiber networks will have to be able to transmit signal containing actual data at 1310 nm, 1550 nm and 1625 nm. Optical fiber networks incorporating fiber that can transmit at all three of these wavelengths are known to be more vulnerable to both Macrobending and Microbending. Microbending is known to be more damaging to transmission at a 1625 wavelength.

There are several sources for the standards for attenuation in the telecommunications industry. One such standards setting organization is The Telecommunications Industry Association (TIA), which is the leading trade association representing the global information and communications technology (ICT) industries through such activities such as: Standards development, Providing Market Intelligence, Government affairs guidance, Certification of optical fiber and networks containing optical fiber and advice regarding World-wide environmental regulatory compliance. TIA's United States Technical Advisory Groups (USTAG) also participates in international standards-setting activities, such as the International Electrotechnical Commission (IEC).

Another source for the standards for attenuation in the telecommunications industry is the IEC. The International Electrotechnical Commission (IEC) is the leading global organization that prepares and publishes international standards for all electrical, electronic and related technologies. These serve as a basis for national standardization and as references when drafting international tenders and contracts.

Telcordia is a U.S. based corporation that provides fiber optic media & components analysis & consulting services. They also write and keep a library of Generic Requirements for Optical Fiber.

All of these organizations have publicly available literature, reports and standards that are used by people of ordinary skill in the art of designing optical fiber networks.

Methods used to test for microbending sensitivity are described in IEC TR 62221, First Edition 10-2001. There are currently four test methods used to determine microbending sensitivity, which is reported in attenuation units of dB/km.

Method A—Expandable Drum calls for at least 400 m of fiber to be wound with minimal tension around an expandable drum with material of fixed roughness on the drum surface. Method B—Fixed-Diameter Drum calls for at least 400 m of fiber to be wound with 3N tension around a fixed-diameter drum with material of fixed roughness on the drum surface. Method C—Wire Mesh calls for application of wire mesh (under load) to the fiber under Test. Method D—Basketweave calls for 2.5 km of fiber to be applied to a fixed diameter drum via a "basketweave" wrap.

Of these four test methods, only Method D, specifically describes a procedure to measure the microbending sensitivity of fibers as a function of temperature and provides the microbending sensitivity over a wide temperature range and suggests that temperature cycling could include lower temperatures such as −60° C.

Throughout this patent application, microbending sensitivity using test Method D—Basketweave will be spoken of in terms of a dB/Km number, at a specified wavelength and temperature.

There are at least four different types of tests currently in use to test for Microbending Sensitivity with test results being reported in attenuation units of dB/km. Four specific Microbending Sensitivity test Methods are described in IEC TR 62221, First Edition 10-2001.

They are as follows:

Method A Expandable Drum: Calls for at least 400 m of fiber to be wound with minimal tension around an expandable drum with material of fixed roughness on the drum surface.

Method B Fixed-diameter drum: Calls for at least 400 m of fiber to be wound with 3N tension around a fixed-diameter drum with material of fixed roughness on the drum surface.

Method C Wire Mesh: Calls for application of wire mesh (under load) to the fiber under Test.

Method D Basketweave: Calls for 2.5 km of fiber to be applied to a fixed diameter drum via a "basketweave" wrap.

Throughout this patent application, Method D measured Microbending Sensitivity will be discussed and reported in units of attenuation which will be spoken of in terms of a dB/Km number, at a specified wavelength and temperature. It is understood that whatever Microbending Sensitivity is given, that the number given is the Maximum Acceptable Increase in Attenuation permissible for that optical fiber in a given telecommunications network.

Of these four test methods, only Method D, specifically describes a procedure to measure the Microbending Sensitivity of fibers as a function of temperature and provides the Microbending Sensitivity over a wide temperature range and suggests that temperature cycling could include lower temperatures such as −60° C.

It is understood, within the industry, that it is unlikely that Optical Fibers in a telecommunications network would be routinely exposed to temperatures as low as −60° C. However, after recent field failures in China, it is also beginning to be understood that having a specification for Microbending Sensitivity for the optical fiber in a telecommunications network at room temperature of approximately 25° C. is not sufficient to protect a telecommunications network from having "dark fiber" develop over the course of a winter where the temperature is below freezing (0° C. or 32° F.) for extended periods of time.

Applicants have chosen to report Microbending Sensitivity as a change in attenuation from a baseline per the IEC procedure; this procedure requires the reporting of change in attenuation be reported at specific wavelengths and a temperature of −60° C. Applicants believe that reporting Microbending Sensitivity data at these extreme temperature conditions will provide a type of "worst case scenario" possibility for Microbending Sensitivity of the coated optical fiber in the field.

It is Applicants' position that if the Microbending Sensitivity properties of the Optical Fiber at the −60° C. level are deemed to be acceptable, then it is reasonable to assume that the performance of the Optical Fiber at room temperature, assuming the same level of mechanical stress, will also be acceptable.

Further to this point, at room temperature Microbending Sensitivity testing it may or may not be possible to identify the difference in Microbending Sensitivity between an Optical Fiber coated with a standard, "non-Supercoatings" coating, because neither Supercoatings or a non-Supercoatings is anywhere near their glass transition temperature (Tg) for the primary coating layer at room temperature.

The difference between an Optical Fiber coated with a standard "non-Supercoatings" coating and an Optical Fiber coated with Supercoatings shows up with Microbending Sensitivity testing at the extreme low temperatures because the standard "non-Supercoatings" Primary Layer exceeds its glass transition temperature at the extreme low temperatures and thus transitions from rubbery state to glassy state. Having the Primary Layer of an Optical Fiber coating being in the glassy state is known to cause an increase in Microbending Sensitivity. In contrast, the Tg of a Supercoatings Primary Layer is much lower and therefore the Primary Layer of Supercoatings remains in the rubbery phase which is better for Microbending Sensitivity.

Another way of explaining the difference between standard "non-Radiation curable Supercoatings" for Optical Fiber and Radiation curable Supercoatings for Optical Fiber is that the combination of fully cured, low modulus and low Tg coatings in the Primary Coating Layer and fully cured, high modulus, high Tg coatings in the Secondary Coating Layer of the Supercoatings leads to acceptable performance under the stress of either extreme temperature or mechanical stress or both temperature and mechanical stress with acceptable performance being gauged by the low level of Microbending Sensitivity which is reflected in the fiber having an acceptable increase in reported attenuation.

In current practice, it is understood that the Telecommunications network generally requests that Optical Fiber be supplied with a known maximum attenuation at 1310 nm and room temperature. This highest tolerable level of attenuation is known to people of ordinary skill in the art of design criteria for Telecommunications networks.

For Optical Fibers coated with Radiation curable Supercoatings, it is possible and desirable to report Microbending Sensitivity at three separate wavelengths and at a very cold (−60° C.) temperature. This data can then be used by the Network designer to understand the limits, and be able to predict failure modes for the network. It is applicants' position that a network containing Optical Fibers coated with standard, "non-Supercoatings" will have much less tolerance to the stress involved from the cable environment of temperature extremes and mechanical forces than will a network containing Optical Fibers coated with Radiation curable Supercoatings. Another factor is that it is believed that using Radiation curable Supercoatings to coat Optical Fiber will provide a Telecommunications network with sufficient data to be able to design without requiring the same "safety margin" as is built in with using standard "non-Radiation curable Supercoatings" to coat Optical Fiber.

The next step in the process is determining the Field Application Environment of the Supercoatings requirements for the telecommunications network where the optical fiber will be installed. The Field Application Environment involves the understanding of four factors:

i) the type of glass being used in the optical fiber;
 ii) whether the Supercoatings Secondary Layer will be applied over the Supercoatings Primary Layer wet on dry or wet on wet;
 iii) the type, number of lights and positioning of lights along the draw tower manufacturing line that are used to cure the Supercoatings on the optical fiber; and
 iv) the line speed at which the Supercoatings will be applied.

Regarding element i): Optical Fiber is known to have standard grades for installation of long haul straight cable. Recently various grades of "bend resistant" Optical Fiber have been developed by Optical Fiber Suppliers such as Corning and Drake and OFS and YOFC and others. These bend resistant Optical Fibers are being deployed in Fiber to the Node (FTTX) and Fiber to the Home (FTTH) applications.

Details about standard grade and Microbend resistant Optical Fibers are available from the Suppliers own literature and websites.

Current commercial Optical Fiber available for sale include: Corning® InfiniCor® optical fibers, Corning® ClearCurve® OM2/OM3/OM4 multimode optical fiber, Corning® ClearCurve® single-mode optical fiber, Corning® SMF-28e® XB optical fiber, Corning® SMF-28® ULL optical fiber, Corning® LEAF® optical fiber, Corning® Vascade® optical fibers and Corning Specialty Fiber, Draka BendBright SingleMode (BB), Draka TeraLight Singlemode (TM), Draka TeraLight Ultra Singlemode (TU), Draka BendBright-XS (BX), Draka Enhanced Single Mode, Draka NZDSF-LA Singlemode (LA), OFS AllWave® Zero Water Peak (ZWP) and newly introduced OFS AllWave FLEXZWP Fibers, OFS LaserWave® Fibers, OFS Access ADVANTAGE™ System. OFS HCS®, OFS FiberWire®, and OFS PYROCOAT® brand technologies, YOFC HiBand GIMM fiber, YOFC High Temperature Fibre (HTF) Series, YOFC HiBand Graded-index Multimode Optical Fiber (50/125 & 62.5/125 um) and others.

Typically fiber to be deployed in straight line applications undergoes less stress, and less microbending than fiber to be deployed in FTTX and FTTH applications. Therefore, the selection of Radiation curable Supercoatings to be applied to fiber for FTTX and FTTH applications is crucial to the performance of FTTX and FTTH optical fiber. Accordingly, whenever the optical fiber to be coated is designated for FTTX and FTTH applications, the Supercoatings must be highly resistant to microbending.

Unique to formulating Supercoatings is just how much of the formulation requirements to achieve the six required properties are dependent upon the Mechanical aspects of the coating of an optical fiber. For example, it is possible to coat a standard grade of Optical Fiber with Supercoatings and obtain a Coated Optical Fiber with desired attenuation properties, but it is also possible to coat a "Bend-Resistant" premium grade of Optical Fiber with a standard, "non. Supercoatings", and have the result be a coated optical fiber with unacceptable Microbending Sensitivity leading to the failure in achieving the system required tolerable level of attenuation. Therefore, in order to produce an optical fiber with the desired attenuation properties it is desirable, optionally even necessary, for the formulator of Supercoatings to have an understanding of the details of the optical fiber production process. These details include the type of glass, the processing temperature, the atmosphere surrounding the application of coating(s), the line speed, the type of radiation source, typically described as a "curing lamp", and the location and number of curing lamps along the processing line and whether the secondary coating is applied over the primary coating wet on wet or wet on dry. These types of mechanical aspects to the glass processing have, in the past, not been of interest to the formulator of the Optical Fiber coatings because the formulator focused on the Optical Fiber coatings and the glass manufacturer focused on the glass. As stated previously, without an adequate amount of information about the processing of the glass, it is possible to coat a standard grade of Optical Fiber with Supercoatings and obtain a Coated Optical Fiber with desired Microbending Sensitivity properties, but it is also possible to coat a "Bend-Resistant" premium grade of Optical Fiber with a standard, non-Supercoatings, and have the result be a coated optical fiber without the desired Microbending Sensitivity properties.

Regarding element iii) the type, number of lights and positioning of lights along the draw tower manufacturing line that are used to cure the Supercoatings on the optical fiber; the use of conventional ultraviolet mercury arc lamps to emit ultraviolet light suitable to cure radiation curable coatings applied to optical fiber is well known. Ultraviolet arc lamps emit light by using an electric arc to excite mercury that resides inside an inert gas (e.g., Argon) environment to generate ultraviolet light which effectuates curing. Alternatively, microwave energy can also be used to excite mercury lamps in an inert gas medium to generate the ultraviolet light. Throughout this patent application, arc excited and microwave excited mercury lamp, plus various additives (ferrous metal, Gallium, etc.) modified forms of these mercury lamps are identified as mercury lamps. Conventional ultraviolet mercury arc lamps are the "state-of-the-art" when it comes to curing of radiation curable coatings for optical fiber.

However, the use of ultraviolet mercury lamps as a radiation source suffers from several disadvantages including environmental concerns from mercury and the generation of ozone as a by-product. Further, mercury lamps typically have lower energy conversion ratio, require warm-up time, generate heat during operation, and consume a large amount of energy when compared with Lights that are generated by Light Emitting Diodes "LED".

Knowing what type of light is going to be used in the curing of the Radiation Curable Supercoatings is critical information because in the production of coated optical fiber, the heat generated by the UV mercury lamps can negatively impact the liquid coating in that if the coating is not formulated to avoid the presence of volatiles, those volatiles may be excited and deposit upon the quartz tube surface, blocking the UV rays from irradiating the liquid coating on the glass fiber which inhibits the curing of the liquid coating to a solid.

In contrast to ultraviolet mercury lamps, light emitting diodes (LEDs) are semiconductor devices which use the phenomenon of electroluminescence to generate light. LEDs consist of a semiconducting material doped with impurities to create a p-n junction capable of emitting light as positive holes join with negative electrons when voltage is applied. The wavelength of emitted light is determined by the materials used in the active region of the semiconductor. Typical materials used in semiconductors of LEDs include, for example, elements from Groups 13 (III) and 15 (V) of the periodic table. These semiconductors are referred to as III-V semiconductors and include, for example, GaAs, GaP, GaAsP, AlGaAs, InGaAsP, AlGaInP, and InGaN semiconductors. Other examples of semiconductors used in LEDs include compounds from Group 14 (IV-IV semiconductor) and Group 12-16 (II-VI). The choice of materials is based on multiple factors including desired wavelength of emission, performance parameters, and cost.

Early LEDs used gallium arsenide (GaAs) to emit infrared (IR) radiation and low intensity red light. Advances in materials science have led to the development of LEDs capable of emitting light with higher intensity and shorter wavelengths, including other colors of visible light and UV light. It is possible to create LEDs that emit light anywhere from a low of about 100 nm to a high of about 900 nm. Currently, known LED UV light sources emit light at wavelengths between about 300 and about 475 nm, with 365 nm, 390 nm and 395 nm being common peak spectral outputs. See textbook, "Light-Emitting Diodes" by E. Fred Schubert, $2^{nd}$ Edition, © E. Fred Schubert 2006, published by Cambridge University Press.

LED lamps offer advantages over conventional mercury lamps in curing applications. For example, LED lamps do not use mercury to generate UV light and are typically less bulky than mercury UV are lamps. In addition, LED lamps are instant on/off sources requiring no warm-up time, which contributes to LED lamps' low energy consumption. LED lamps also generate much less heat, with higher energy conversion efficiency, have longer lamp lifetimes, and are essentially monochromatic emitting a desired wavelength of light which is governed by the choice of semiconductor materials employed in the LED.

Several manufacturers offer LED lamps for commercial curing applications. For example, Phoseon Technology, Summit UV Honle UV America, Inc., IST Metz GmbH, Jenton International Ltd., Lumios Solutions Ltd., Solid UV Inc., Seoul Optodevice Co., Ltd, Spectronics Corporation, Luminus Devices Inc., and Clearstone Technologies, are some of the manufacturers currently offering LED lamps for curing ink-jet printing compositions, PVC floor coating compositions, metal coating compositions, plastic coating composition, and adhesive compositions.

Regarding element iv) the line speed at which the Supercoatings will be applied, in D1381 RADIATION CURABLE SUPERCOATINGS FOR OPTICAL FIBER, U.S. patent application Ser. No. 11/955,541, filed Dec. 13, 2007, published on Sep. 18, 2009 as US Published Patent Application 20080226909, entitled it is stated that a Supercoating may be applied to single-mode optical fiber at a line speed of between about 750 meters/minute to about 2100 meters/minute. As of the date of filing this patent application, Oct. 8, 2010, the optical fiber industry has now progressed to the point where it is possible to draw single-mode optical fiber at line speeds in excess of 2100 meters/minute. It is also possible to draw single-mode optical fiber at line speeds in excess of 2200 meters/minute. It is also possible to draw single-mode optical fiber at line speeds in excess of 2300 meters/minute. It is believed, without intending to be bound thereby that it may also be possible to draw single-mode optical fiber at line speeds in excess of 2350 meters/minute. It is believed, without intending to be bound thereby, that it may also be not possible to draw single-mode optical fiber at line speeds in excess of 2400 meters/minute.

Figure 1:
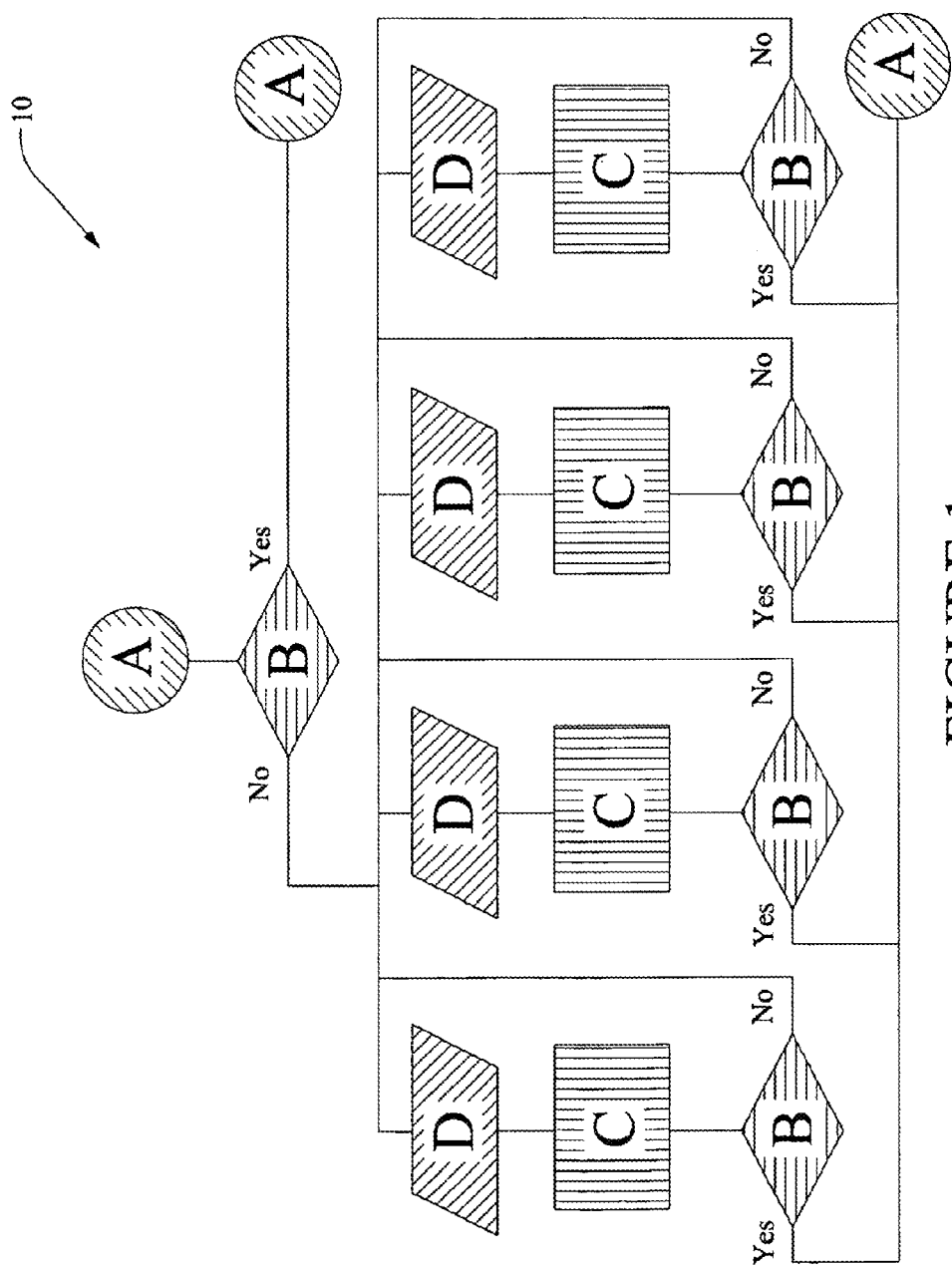
FIG. 1 is a diagram of historical depiction of formulation diagram for how typical formulating for optical fiber coatings has been done—illustrating the prior art. This is a comparative example, not an example of the instant claimed invention.

The next step in the process involves using a Three-Dimensional Laced Methodology Evaluation of candidate Radiation curable Supercoatings by evaluation of the Radiation curable Supercoatings Primary Layer and Secondary Layer. Historically Primary and Secondary coatings for optical fiber were formulated and reformulated according to a two-dimensional diagramed way of formulating. FIG. 1 is a diagram of historical depiction of formulation diagram for how typical formulating for optical fiber coatings has been done-illustrating the prior art.

In FIG. 1, Decision Chart 10 shows the two-dimensional Prior Art approach to formulating optical fiber coatings. In FIG. 1, desirable functional property A is illustrated by circle A, Review Point B represents the test to determine whether the liquid optical fiber coating or the cured coating, either in the form of a flat film or in the form of a tubular coating on the optical fiber, has the desired functional property. If the optical fiber coating does have the desired functional property than the decision tree goes to yes and the inquiry is over. If the optical Fiber coating does not have the desired functional property, the formulator reviews the formulation and determines the change to make, as represented by parallelogram D, and then in rectangle C, the formulation is changed. The functional property is retested at Review Point B, and if the desired functional property is obtained then the inquiry is over. If the desired functional property is not obtained, then the decision tree goes back to the top and other reformulating options by the formulator are considered until the next possible formulation is determined and then the formulation is changed and then the desired functional property is retested. This continues until the desired physical property is obtained.

The possible ways to change the coating are illustrated by the information contained n Table 1A, 1B, 1C, 1D, 1E, 2A, 2B, 2C, 2D, 2E, 1F, 2F, 1G, 2G, 1H, 2H, 1J, and 2J which summarize the state-of-the-art understanding of the ingredients that may or may not be used in formulating Primary and Secondary Radiation Curable Coatings for optical fiber with respect to creating formulations with physical properties of the Primary Coating Layers and Secondary Coating Layers on the Optical Fiber that meet the rigorous criteria of Supercoatings. In addition to the information in the Tables contained herein, additional information may be found in issued patents, published patent applications, scientific papers and other information commonly known to people of ordinary skill in the art of Radiation Curable Coatings for Optical Fiber.

TABLE 1A

Choice of Oligomer for Supercoatings-Primary

| Chemistry of Oligomer for Supercoatings-Primary | Sub-Chemistry, within the category | Benefits | Disadvantages-includes undesirable interactions with other components |
|---|---|---|---|
| 1. urethane (meth)acrylate (most commonly used oligomer for optical fiber coatings) | other UV-curable end-groups e.g. vinyl ether, (meth)acrylamide, vinyl amide | fast cure, toughness, stability, versatility, many polyols available, ease of manufacture | high viscosity |
| 2. polyester (meth)acrylate | other UV-curable end-groups e.g. vinyl ether, (meth)acrylamide, vinyl amide | fast cure, low viscosity, versatility, many polyols and acids available, oxidative stability | low elongation, poorer hydrolytic stability, more difficult to manufacture |
| 3. silicone (meth)acrylate | other UV-curable end-groups e.g. vinyl ether, (meth)acrylamide, vinyl amide | very low Tg, hydrophobic and lipophobic, fast cure, stability, low viscosity | expensive, specialized manufacture, refractive index may be too low |
| 4. hydrocarbon (e.g. polybutadiene) (meth)acrylate | other UV-curable end-groups e.g. vinyl ether, (meth)acrylamide, vinyl amide | very low Tg, hydrophobic, hydrolytic stability, low viscosity | poorer oxidative stability, poorer solubility, lipophilic |
| 5. fluorocarbon (meth)acrylate | other UV-curable end-groups e.g. vinyl ether, (meth)acrylamide, vinyl amide | low Tg, hydrophobic and lipophobic, fast cure, stability, low viscosity | expensive, poorer solubility, refractive index may be too low, specialized manufacture |
| 6. thiol-ene | various enes including, norbornene, vinyl ether, vinyl ester, vinyl amide, allyl ether, allyl ester, allyl amide, styrene, alkenes (aliphatic enes are used for low Tg) | strong network structure, low viscosity, good cured stability | odor, shelf stability |
| Chemistry of Oligomer | Sub-Chemistry, within the category | Benefits | Disadvantages-includes undesirable interactions with other components |
| 7. acrylated acrylic polymer or copolymer | Other UV-curable end-groups e.g. vinyl ether, (meth) acrylamide, vinyl amide | | |
| 8. cationic epoxy | various cationically curable groups including glycidyl ether, glycidyl ester, vinyl ether, oxetane, hydroxyl (aliphatic materials are used for low Tg) | low shrinkage, good adhesion, low viscosity, stability | slower cure speed, post curing effect, lower elongation |

TABLE 1B

Choice of Oligomer for Supercoatings-Primary

| Selection of Polyol to formulate Urethane Oligomer | Sub-Chemistry, within the category | Benefits | Disadvantages-includes undesirable interactions with other components |
|---|---|---|---|
| 1. polyether (most commonly used polyol for optical fiber oligomers) | poly(alkylene glycols), poly(arylene glycols), copolymers with other types of polyols | hydrolytic stability, flexibility, low viscosity | oxidative stability |
| 2. polyester | aliphatic, aromatic, linear, branched | oxidative stability | higher Tg, poorer oxidative stability |
| 3. polycarbonate | aliphatic, aromatic, linear, branched | oxidative and hydrolytic stability | higher Tg, potential crystallinity |
| 4. hydrocarbon | aliphatic, aromatic, linear, branched, cyclic, saturated, unsaturated | hydrophobic, good stability | poor oxidative stability if unsaturated, solubility, lipophilic |
| 5. silicone | aliphatic, aromatic, linear, branched | hydrophobic and lipophobic, stability, low viscosity | expensive, refractive index may be too low |
| 6. fluorocarbon | aliphatic, aromatic, linear, branched | hydrophobic and lipophobic, stability, low viscosity | expensive, refractive index may be too low |
| 7. bio-based | Various vegetable, see, nut, biomass and other plant-derived polyols | Generally low Tg, hydrophobic, good stability, sustainable | May have lower purity or homogeneity |

TABLE 1C

Choice of Oligomer for Supercoatings-Primary

| Selection of Isocyanate to formulate Urethane Oligomer | Sub-Chemistry, within the category** | Benefits | Disadvantages-includes undesirable interactions with other components |
|---|---|---|---|
| 1. aromatic | TDI, MDI | faster reaction, low cost | yellowing, toxicity |
| 2. aliphatic | IPDI, HDI, TMDI | low yellowing | higher cost, slower reaction |
| 3. alkyl-aryl | TMXDI | stability | higher cost, slower reaction |
| 4. DESMODUR ® W* | bis(4-isocyanotocyclohexyl) methane also known as PICM, hydrogenated MDI (HMDI or H12MDI), saturated MDI (SMDI), reduced MDI (RMDI), and dicyclohexylmethane diisocyanate | Polyurethane resins based on *Desmodur ® W diisocyanate have a high degree of flexibility coupled with good mechanical strength. They are resistant to abrasion and hydrolysis and retain gloss and physical properties upon weathering. A unique feature of *Desmodur ® W diisocyanate is its ability to form optically clear polyurethanes when combined with suitable polyol coreactants. | non-homogenous isomer blending may lead to reproducibility issues for each oligomer made with this isocyanate. The reproducibility issues for each oligomer may then lead to unexpected performance properties of formulated coating |

*trademark of Bayer
**definitions for abbreviations are as follows:
TDI is toluene diisocyanate
MDI is methylenebis(phenyl isocyanate) OR Methyl Di-P-Phenylene Isocyanate
IPDI is isophorone diisocyanate
HDI is Hexamethylene diisocyanate
TMDI is Trimethyl hexamethylene diisocyanate
TMXDI is TMXDI ® (Meta) Aliphatic Isocyanate, available from Cytec Industries Inc.

TABLE 1D

Choice of Oligomer for Supercoatings-Primary

| Selection of Inhibitor to formulate oligomer | Sub-Chemistry, within the category | Benefits | Disadvantages-includes undesirable interactions with other components |
|---|---|---|---|
| 1. Hydroquinone type | Hydroquinone, Methylether hydroquinone, Butyl hydroxytoluene. | Improve process and shelf stability | Color change; retard polymerization reaction |
| 2. Butylated hydroxyl toluene (most widely used) | Phenolic | Low Cost, good solubility, effective | Less effective at higher temperatures |
| 3. Phenothiazine | | Improve Process and shelf stability | Color change; retard polymerization reaction |

TABLE 1E

Choice of Oligomer for Supercoatings-Primary

| Selection of Catalyst to formulate oligomer | Sub-Chemistry, within the category | Benefits | Disadvantages-includes undesirable interactions with other components |
|---|---|---|---|
| 1. Amine compounds | Tertiary amines | Versatile catalyst | Side reactions lead to byproducts, such as urea, isocyanate trimers. |
| 2. Organometallic complexes | Mercury, lead, tin, bismuth, zinc compounds | Highly effective | Some are highly toxic and hazardous |

TABLE 2A

Choice of Oligomer for Supercoatings-Secondary

| Chemistry of Oligomer | Sub-Chemistry, within the category | Benefits | Disadvantages-includes undesirable interactions with other components |
|---|---|---|---|
| 1. urethane (meth)acrylate | other UV-curable end-groups e.g. vinyl ether, (meth)acrylamide, vinyl amide (most commonly used oligomer chemistry for optical fiber coatings) | fast cure, toughness, stability, versatility, many polyols available, ease of manufacture | high viscosity |
| 2. polyester (meth)acrylate | other UV-curable end-groups e.g. vinyl ether, (meth)acrylamide, vinyl amide | fast cure, low viscosity, versatility, many polyols and acids available, oxidative stability | low elongation, poorer hydrolytic stability, more difficult to manufacture |
| 3. silicone (meth)acrylate | other UV-curable end-groups e.g. vinyl ether, (meth)acrylamide, vinyl amide (diphenyl silicone acrylates have high Tg) | hydrophobic and lipophobic, fast cure, stability, low viscosity | generally low Tg, expensive, specialized manufacture, refractive index may be too low |
| 4. hydrocarbon (meth)acrylate | other UV-curable end-groups e.g. vinyl ether, (meth)acrylamide, vinyl amide (aromatic and cyclic hydrocarbons can have high Tg) | hydrophobic, hydrolytic stability, low viscosity | poorer oxidative stability, poorer solubility, lipophilic, generally low Tg |
| 5. fluorocarbon (meth)acrylate | other UV-curable end-groups e.g. vinyl ether, (meth)acrylamide, vinyl amide (aromatic and cyclic fluorocarbons can have high Tg) | hydrophobic and lipophobic, fast cure, stability, low viscosity | expensive, poorer solubility, refractive index may be too low, specialized manufacture, generally low Tg |
| 6. acrylated acrylic polymer or copolymer | Other UV-curable end-groups e.g. vinyl ether, (meth)acrylamide, vinyl amide | Adjustable Tg, good stability, good chemical resistance | Specialized manufacture, generally high viscosity |
| 7. thiol-ene | various enes including, norbornene, vinyl ether, vinyl ester, vinyl amide, allyl ether, allyl ester, allyl amide, styrene, alkenes (aromatic or cyclic enes for higher Tg) | strong network structure, low viscosity, good cured stability | odor, shelf stability |
| 8. cationic epoxy | various cationically curable groups including glycidyl ether, glycidyl ester, vinyl ether, oxetane, hydroxyl (aromatic materials for higher Tg) | low shrinkage, good adhesion, low viscosity, stability | slower cure speed, post curing effect, lower elongation |

TABLE 2B

Choice of Oligomer for Supercoatings-Secondary

| Chemistry of polyol to formulate Urethane oligomer | Sub-Chemistry, within the category | Benefits | Disadvantages-includes undesirable interactions with other components |
|---|---|---|---|
| 1. polyether (most commonly used polyol for optical fiber oligomers) | poly(alkylene glycols), poly(arylene glycols), copolymers with other types of polyols | hydrolytic stability, flexibility, cure speed, low viscosity | oxidative stability, generally low Tg |

TABLE 2B-continued

Choice of Oligomer for Supercoatings-Secondary

| Chemistry of polyol to formulate Urethane oligomer | Sub-Chemistry, within the category | Benefits | Disadvantages-includes undesirable interactions with other components |
|---|---|---|---|
| 2. polyester | aliphatic, aromatic, linear, branched | oxidative stability, higher Tg | poorer oxidative stability |
| 3. polycarbonate | aliphatic, aromatic, linear, branched | oxidative and hydrolytic stability, higher Tg | potential crystallinity |
| 4. hydrocarbon | aliphatic, aromatic, linear, branched, cyclic, saturated, unsaturated (aromatic and cyclic hydrocarbons can have high Tg) | hydrophobic, good stability | poor oxidative stability if unsaturated, solubility, lipophilic |
| 5. silicone | aliphatic, aromatic, linear, branched (diphenyl silicone acrylates have high Tg) | hydrophobic and lipophobic, stability, low viscosity | expensive, refractive index may be too low, generally low Tg |
| 6. bio-based | Various vegetable, seed, nut, biomass and other plant-derived polyols | Generally low Tg, hydrophobic, good stability, sustainable | May have lower purity or homogeneity |

TABLE 2C

Choice of Oligomer for Supercoatings-Secondary

| Chemistry of Isocyanate to formulate Urethane oligomer | Sub-Chemistry, within the category | Benefits | Disadvantages-includes undesirable interactions with other components |
|---|---|---|---|
| 1. aromatic | TDI, MDI | faster reaction, low cost | yellowing, toxicity |
| 2. aliphatic | IPDI, HDI, TMDI | low yellowing | higher cost, slower reaction |
| 3. alkyl-aryl | TMXDI | stability | higher cost, slower reaction |

TABLE 2D

Choice of Oligomer for Supercoatings-Secondary

| Chemistry of Inhibitor to formulate oligomer | Sub-Chemistry, within the category | Benefits | Disadvantages-includes undesirable interactions with other components |
|---|---|---|---|
| 1. Hydroquinone type | Hydroquinone, Methylether hydroquinone, Butyl hydroxytoluene. | Improve process and shelf stability | Color change; retard polymerization reaction |
| 2. Butylated hydroxyl toluene (most widely used) | Phenolic | Low Cost, good solubility, effective | Less effective at higher temperatures |
| 3. phenothiazine | | Improve process and shelf stability | Color change, retard polymerization reaction |

TABLE 2E

Choice of Oligomer for Supercoatings-Secondary

| Chemistry of Catalyst to formulate urethane oligomer | Sub-Chemistry, within the category | Benefits | Disadvantages-includes undesirable interactions with other components |
|---|---|---|---|
| 1. Amine Compounds | Tertiary amines | Versatile catalyst | Side reactions lead to byproducts, such as urea, isocyanate trimers. |
| 2. Organometallic complexes | Mercury, lead, tin, bismuth, zinc compounds | Highly effective | Some are highly toxic and hazardous |

TABLE 1F

Choice of Photoinitiator for Supercoatings-Primary

| Chemistry | Benefits | Disadvantages-includes undesirable interactions with other components |
|---|---|---|
| 1. α-hydroxy ketones | fast cure, low yellowing, low cost, good through-cure and surface cure | can be volatile |
| 2. (bis) acylphosphine oxides | very fast cure, low yellowing, good through-cure | more expensive, may have crystals |
| 3. benzophenones | low cost, good surface-cure | require an amine, slower, yellows |
| 4. polymeric photoinitiators | low volatility, good through-cure and surface-cure | more expensive |
| 5. others (many) | may have low cost | generally slower-curing, may have lower shelf-stability, may yellow |

TABLE 2F

Choice of Photoinitiator for Supercoatings-Secondary

| Chemistry | Benefits | Disadvantages-includes undesirable interactions with other components |
|---|---|---|
| 1. α-hydroxy ketones | fast cure, low yellowing, low cost, good through-cure and surface cure | can be volatile |
| 2. (bis) acylphosphine oxides | very fast cure, low yellowing, good through-cure, good for colored secondaries | more expensive, may have crystals, poorer surface-cure |
| 3. benzophenones | low cost, good surface-cure | require an amine, slower, yellows |
| 4. polymeric photoinitiators | low volatility, good through-cure and surface-cure | more expensive |
| 5. morpholino-containing | good for colored secondaries | may screen too much UV light from reaching primary coating in wet-on-wet process |
| 6. others (many) | may have low cost | generally slower-curing, may have lower shelf-stability, may yellow |

TABLE 1G

Choice of Adhesion Promoter for Supercoatings-Primary

| Chemistry | Benefits | Disadvantages-includes undesirable interactions with other components |
|---|---|---|
| 1. silane coupling agents | good dry and wet adhesion | moisture-sensitive (shelf-stability issue), possible to cause reduced cure speed and lower modulus |
| 2. acid-functional materials | good dry adhesion | generally poorer wet adhesion |
| 3. polar monomers or oligomers | good dry adhesion | generally poorer wet adhesion |

TABLE 2G

Choice of Adhesion Promoter for Supercoatings-Secondary Chemistry

| |
|---|
| None, adhesion promoters are not used in Secondary Coatings, only in Primary Coatings |

TABLE 1H

Choice of Diluent Monomer for Supercoatings-Primary

| Chemistry | Benefits | Disadvantages-includes undesirable interactions with other components |
|---|---|---|
| 1. alkyl (meth)acrylate | generally low Tg, hydrophobic, good stability, low cost, good diluent (generally monofunctional monomer used for lower crosslink density and modulus) | odor, slower cure speed, may be crystalline, volatile under high heat output of conventional mercury UV lights |

TABLE 1H-continued

Choice of Diluent Monomer for Supercoatings-Primary

| Chemistry | Benefits | Disadvantages-includes undesirable interactions with other components |
|---|---|---|
| 2. aryl or cyclic (meth)acrylate | generally higher Tg, hydrophobic | may be volatile or crystalline |
| 3. ether (meth)acrylate | generally low Tg, fast cure speed, generally good diluent, aromatics have good dry adhesion (generally monofunctional monomer used for lower crosslink density and modulus) | more hydrophilic, poorer oxidative stability |
| 4. hydroxyl-functional, acid-functional, and other polar monomers | good dry adhesion, fast cure speed (generally monofunctional monomer used for lower crosslink density and modulus) | generally higher Tg, more hydrophilic, can react with other coating components |
| 5. (meth)acrylamides and vinyl amides | good dry adhesion, fast cure speed (generally monofunctional monomer used for lower crosslink density and modulus) | generally higher Tg, more hydrophilic |

TABLE 2H

Choice of Diluent Monomer for Supercoatings-Secondary

| Chemistry | Benefits | Disadvantages-includes undesirable interactions with other components |
|---|---|---|
| 1. alkyl (meth)acrylate | hydrophobic, good stress-relaxation if branched, good stability, low cost, good diluent (generally multifunctional monomer used for higher crosslink density and modulus) | volatility, odor, slower cure speed, may be crystalline |
| 2. aryl or cyclic (meth)acrylate | generally higher Tg, hydrophobic (generally multifunctional monomer used for higher crosslink density and modulus) | Some aryl species, e.g. phenoxy ethyl acrylate, are volatile under high heat output of conventional mercury UV lights or crystalline; therefore when an aryl reactive diluent monomer is present that has a molecular weight less than about 300, it should be present at no more than about 10 wt. % of the total formulation |
| 3. ether (meth)acrylate | good stress-relaxation if branched, fast cure speed, generally good diluent (generally multifunctional monomer used for higher crosslink density and modulus) | more hydrophilic, poorer oxidative stability |
| 4. hydroxyl-functional, acid-functional, and other polar monomers | fast cure speed (generally multifunctional monomer used for higher crosslink density and modulus) | more hydrophilic, can react with other coating components |
| 5. (meth)acrylamides and vinyl amides | fast cure speed (generally multifunctional monomer used for higher crosslink density and modulus) | more hydrophilic |

TABLE 1J

Choice of Stabilizer for Supercoatings-Primary

| Chemistry | Benefits | Disadvantages-includes undesirable interactions with other components |
|---|---|---|
| 1. hindered phenol | good for oxidative stability, low yellowing | may have poor solubility, crystallinity, high cost |
| 2. hindered amine | good for low yellowing | basicity (may lower glass strength), may react with other coating components |
| 3. UV absorbers | good for low yellowing | may slow cure speed of both secondary and primary coating |
| 4. others e.g. phosphites, sulfides, metallic, mixed stabilizers . . . | may improve cured coating stability and reduce yellowing | may have poor solubility, crystallinity, high cost |

TABLE 2J

Choice of Antioxidant for Supercoatings-Secondary

| Chemistry | Benefits | Disadvantages-includes undesirable interactions with other components |
| --- | --- | --- |
| 1. hindered phenol | good for oxidative stability, low yellowing | may have poor solubility, crystallinity, high cost |
| 2. hindered amine | good for low yellowing | basicity (may lower glass strength), may react with other coating components |
| 3. UV absorbers | good for low yellowing | may slow cure speed of both secondary and primary coating |
| 4. others e.g. phosphites, sulfides, metallic, mixed stabilizers . . . | may improve cured coating stability and reduce yellowing | may have poor solubility, crystallinity, high cost |

In contrast to the "two-dimensional" approach illustrated in FIG. 1, FIG. 2 illustrates step 2 is the first aspect of the instant claimed invention method for formulating Supercoatings for Optical Fiber. FIG. 2 shows six Decision Charts, 10, 20, 30, 40, 50 and 60 linked together in a three dimensional model by linking lace 307. Linking Lace 307 illustrates that any formulation change made in either the Primary Coating Layer or the Secondary Coating Layer of an Optical Fiber Supercoatings means that the other desired properties of an Optical Fiber Supercoatings must be tested after the initial change has been made, in order to be certain that one or more changes in the formulation don't lead to a negative influence on one or more functional properties of the Primary Coating Layer and Secondary Coating Layer.

The six necessary properties for Supercoatings for Optical Fiber are as follows:

The cured Primary Coating on the optical fiber has the following properties after initial cure and after one month aging at 85° C. and 85% relative humidity:

A) a % RAU of from about 84% to about 99%;

B) an in-situ modulus of between about 0.15 MPa and about 0.60 MPa; and

C) a Tube Tg, of from about −25° C. to about −55° C.;

wherein the cured Secondary Coating on the optical fiber has the following properties after initial cure and after one month aging at 85° C. and 85% relative humidity:

A) a % RAU of from about 80% to about 98%;

B) an in-situ modulus of between about 0.60 GPa and about 1.90 GPa; and

C) a Tube Tg, of from about 50° C. to about 80° C.

Step ii) of the instant claimed invention, as illustrated in FIG. 2, shows that any formulation change made to affect one of these six properties, means that all of the other five functional properties must be tested as well, to make sure that changing one aspect of the Supercoatings does not affect the other five aspects.

FIG. 3 shows the second embodiment of step ii) of the instant claimed method for formulating Supercoatings for Optical Fiber. In FIG. 3, the possible changes involving reformulation of a Primary Coating Layer or Secondary Coating Layer of Supercoatings must be tested against each other to see if one change to achieve a desired functional property could also cause other changes that would negate a desired functional property.

FIG. 4 shows the third embodiment of step ii) of the instant claimed method for formulating Supercoatings for Optical Fiber. In FIG. 4, the possible changes are linked by linking laces both horizontally and vertically amongst the six necessary functional Supercoatings properties. This linkage of properties is the essence of what makes Supercoatings for Optical Fibers different from simply a primary coating covered by a secondary coating layer. With Supercoatings for optical fiber, the reality is that instead of formulating the Primary and Secondary coating layers separately from each other, that any formulation change in one of the layers, must be tested against all the properties required of the Supercoatings.

The second aspect of the instant claimed invention is the Method of the first aspect of the instant claimed invention, in which the Three-Dimensional Laced Methodology includes using a Multi-Layer Film Drawdown method to evaluate composite fused Primary Coating Layer and Secondary Coating Layer of Radiation curable Supercoatings.

The third aspect of the instant claimed invention is a Multi-Layer Film Drawdown Method comprising the steps of:

a) selecting a substrate for the test;

b) applying a Primary coating to the substrate using a defined thickness drawdown bar;

c) optionally curing the Primary coating;

d) applying a Secondary coating to the Primary coating using a defined thickness drawdown bar, wherein the defined thickness of the drawdown bar to apply the Secondary coating is greater than the defined thickness of the drawdown bar used to apply the primary coating;

e) applying radiation to the multi-layer film sufficient to effectuate the cure of both the Primary and Secondary into a Fused Composite film;

f) removing the film from the substrate; and evaluating the functional properties of the cured film.

Figure 5:
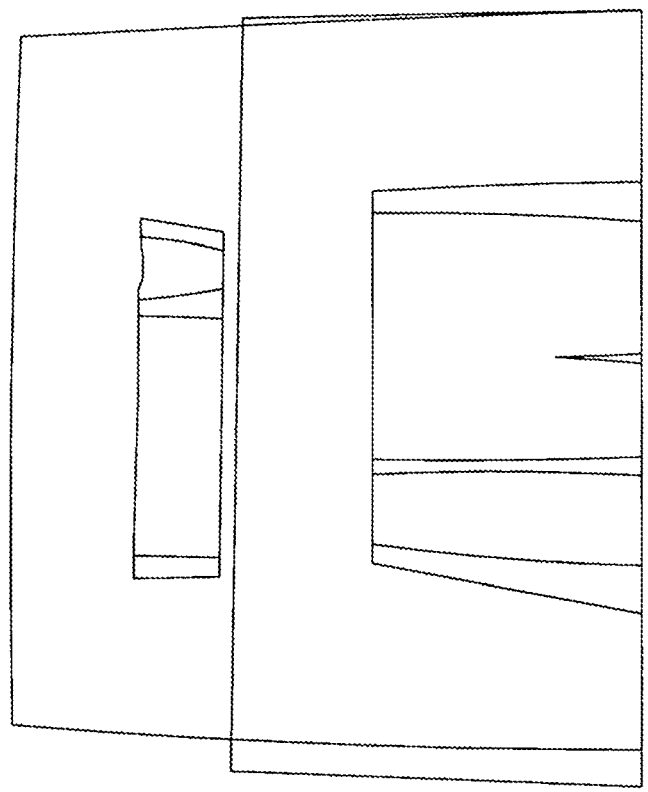
FIG. 5 is an illustration of the results of the Multi-Layer Film Drawdown method showing a colored photograph of a Supercoatings Primary Layer, drawn down with a 1.5 mil bar, then a candidate for Supercoatings Secondary layer, observed as a brown layer, is drawn down over the primary with a 3 mil bar, and the whole plate cured.
Figure 6:
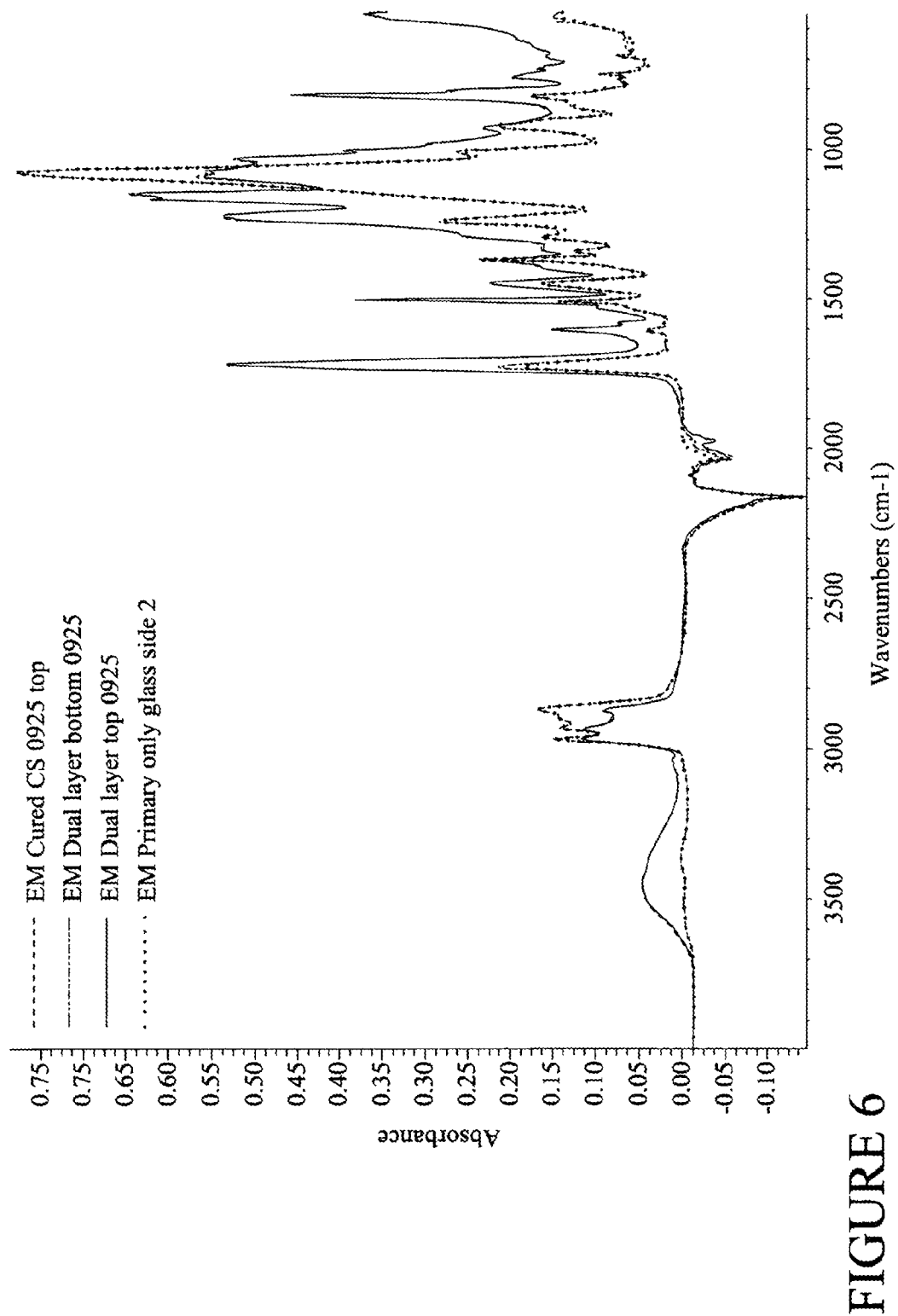
FIG. 6 is Spectra "all", which shows 4 spectra with a comparable appearance to two sets of two sitting on top of each other.

FIG. 5 shows one such Film.

The Multi-Layer Film Drawdown method flat plate substrate method for evaluation of layers of potential Radiation curable Supercoatings-Primary and Secondary Layers comprises the following steps:

1) For reference the general method for preparing drawdown films for UV curing is described by Szum et al., 43rd IWCS Proceedings (1994), p. 59.

2) The typical practice is to start with a clean single-thickness window-pane glass. One or more small daubs of test coatings are applied to the glass plate itself, or to an overlaid polyester sheet covering the glass plate, and drawn down with a Bird type calibrated bar to spread a coherent thin film of 25μ to 75μ. One such Bird type bar for the first layer has a film deposit height of 1.5 mils. These test coatings are most typically inner primary coatings.

3) Immediately after this first drawdown, a second drawdown is made over the top and wide enough to cover the edges of the first drawdown films. This second drawdown is also made with a Bird type bar calibrated to deposit a film of typically 75μ to 254μ. One such Bird type bar for the second layer has a film deposit height of 3.0 mils. The glass plate with the two drawdowns and the consequent composite films is exposed to suitable actinic radiation to achieve the desired degree of cure. This method is known as the wet-on-wet method.

4) A similar method known as wet-on-dry method, is conducted in the same manner as the wet-on-wet method described above; except the first drawdown films are exposed to actinic radiation to effectuate the cure of the Primary Coating Layer. After this radiant exposure the second drawdown is made and the plate is then further exposed to radiation to effectuate the cure of the Secondary Layer and the Primary Layer into a Fused Composite film.

5) This procedure results in the glass plate having upon its surface area cured composite films composed of a first layer of specified thickness and a second layer of a thickness calculated by the difference of the thickness of the first layer subtracted from the nominal thickness of the calibrated Bird type bar used for the second overcoating drawdown. These Fused Composite films are then suitable for typical testing related to the properties desirable in Radiation curable Supercoatings intended for optical fiber applications.

The method is used to apply some small dots of primary to a glass plate and drawdown with a 1 mil or 1.5 mil Bird Bar. While the primary is still uncured, a second drawdown of a colored secondary coating layer is made over the primary coating layer but with a 3 mil bar. The result is observed to be acceptably uniform as can be seen in FIG. 5.

In practice, the Supercoatings Primary Layer is drawn down with a 1.5 mil bar, then a candidate for Supercoatings Secondary layer, observed as a brown layer, Example 3SA3 Color twoH, (Color 2HBrown) is drawn down over the Supercoatings Primary with a 3 mil bar. After this wet-on-wet application, the plate is exposed to radiation sufficient to effectuate the cure of both the Primary Coating Layer and the Secondary Coating Layer into a Fused Composite Film.

In FIG. 5, The Fused Composite film appears to be very uniform with the darker areas being 3 mil of colored secondary, and the lighter areas 1.5 mil each of primary and colored secondary over the top. The Fused Composite film is easily removable and hand able for measurements of thickness and % RAUs, a critical measurement for both layers of Supercoatings for Optical Fiber.

Follow-up analysis shows very little mixing of the layers during the dual-drawdown method.

It was surprising to discover that a simple w-o-w drawdown would leave both the bottom and top layers intact with their separate identities, and yet the two layers then fuse into a Fused Composite film during cure.

Figure 7:
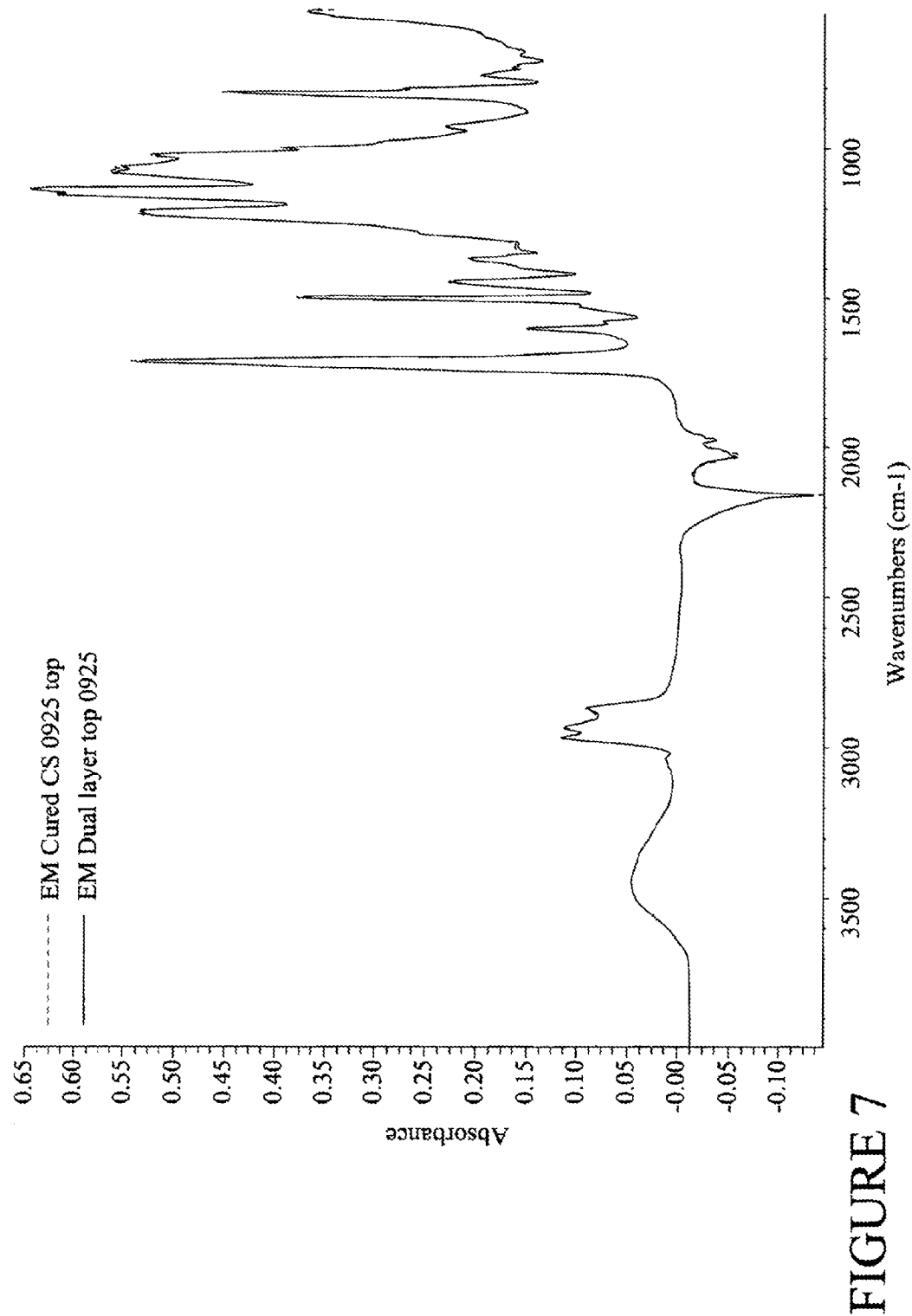
FIG. 7 is Spectra "Brown" shows the colored secondary portion only, and the top of the dual drawdown portion. The two spectra match up quite well.
Figure 8:
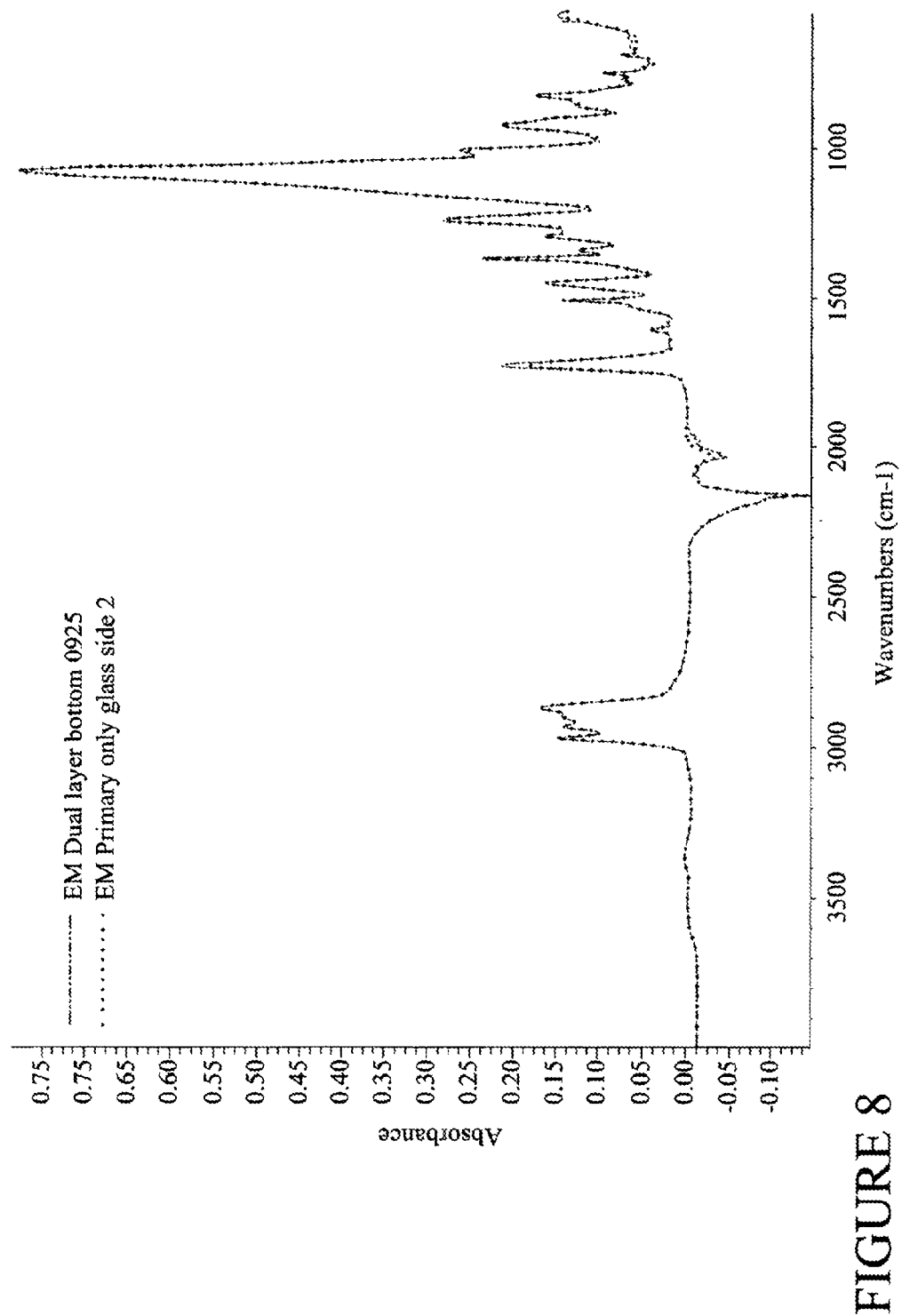
FIG. 8 is Spectra "for the Supercoatings Primary Layer from Example 1PC1" shows the glass side of the dual layer, and the glass side of a single 3 mil, Example 1PC1 Supercoatings Primary Layer drawdown. Again the spectra match up very well.
Figure 9:
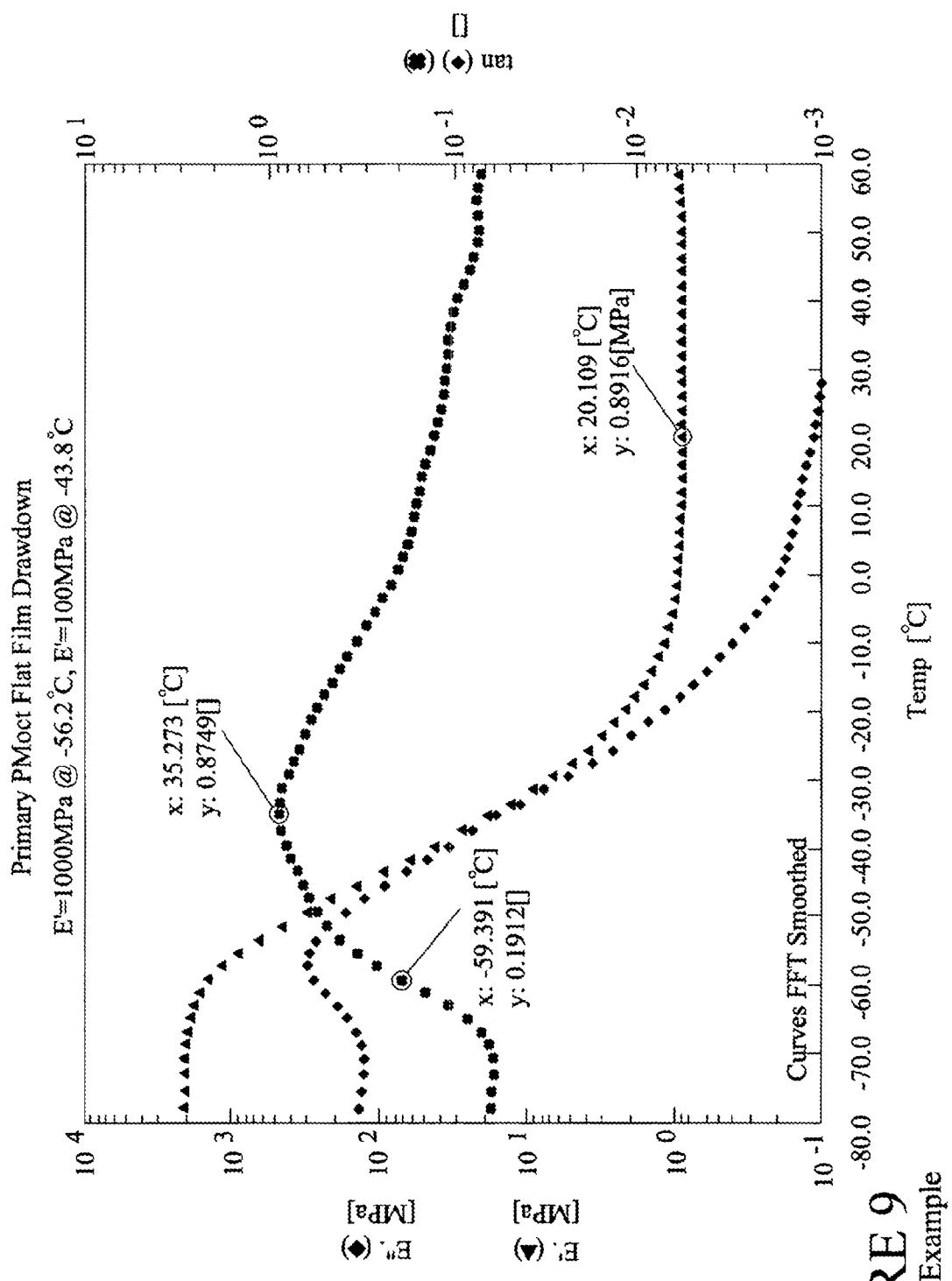
FIG. 9 is a DMA plot of a Flat Film Drawdown of Primary PMoct Supercoatings Candidate, this is a Comparative Example, not an Example of the Instant Claimed Test Method.
Figure 10:
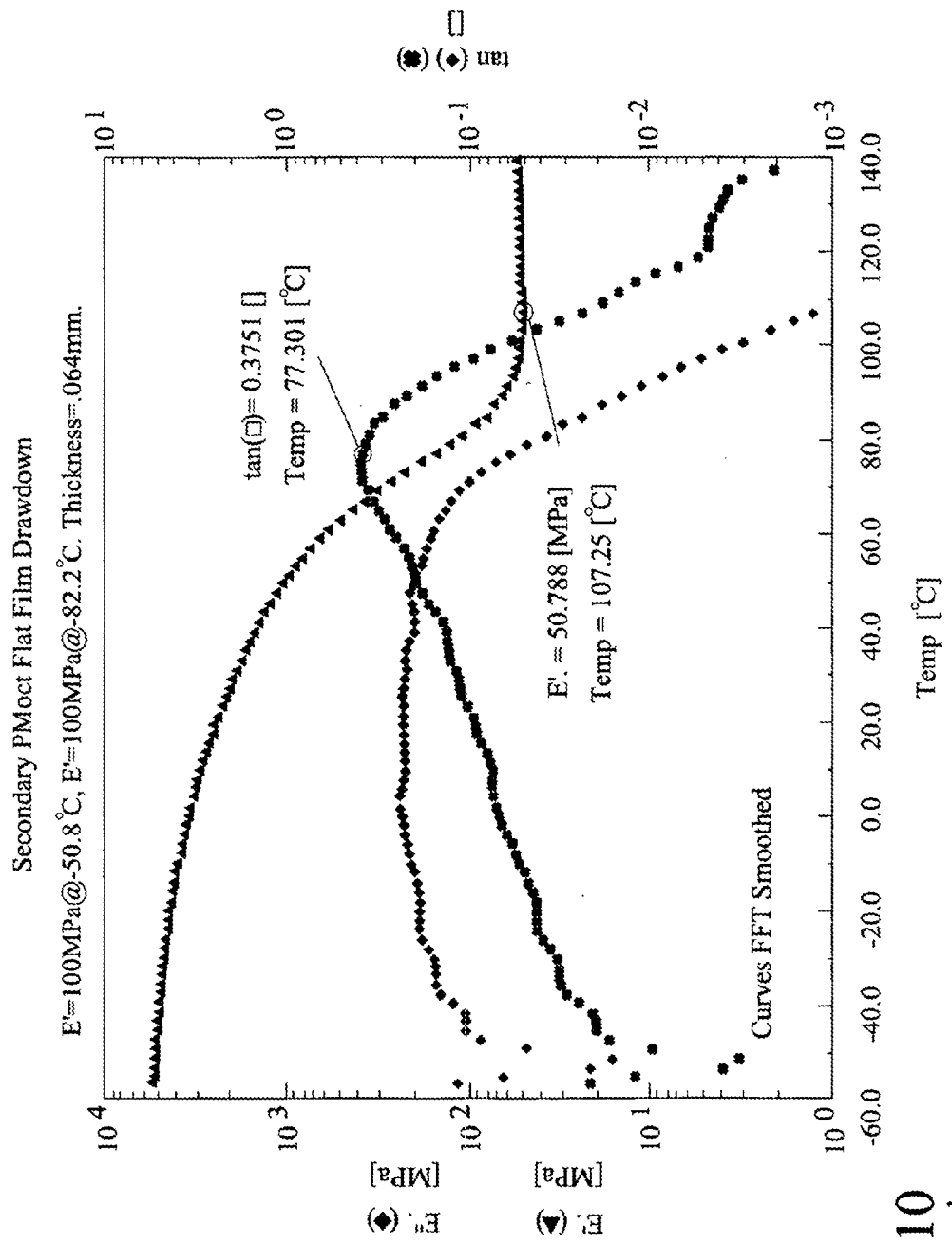
FIG. 10 is a DMA plot of a Flat Film Drawdown of Secondary PMoct, Supercoatings Candidate, this is a Comparative Example, not an Example of the Instant Claimed Test Method.
Figure 11:
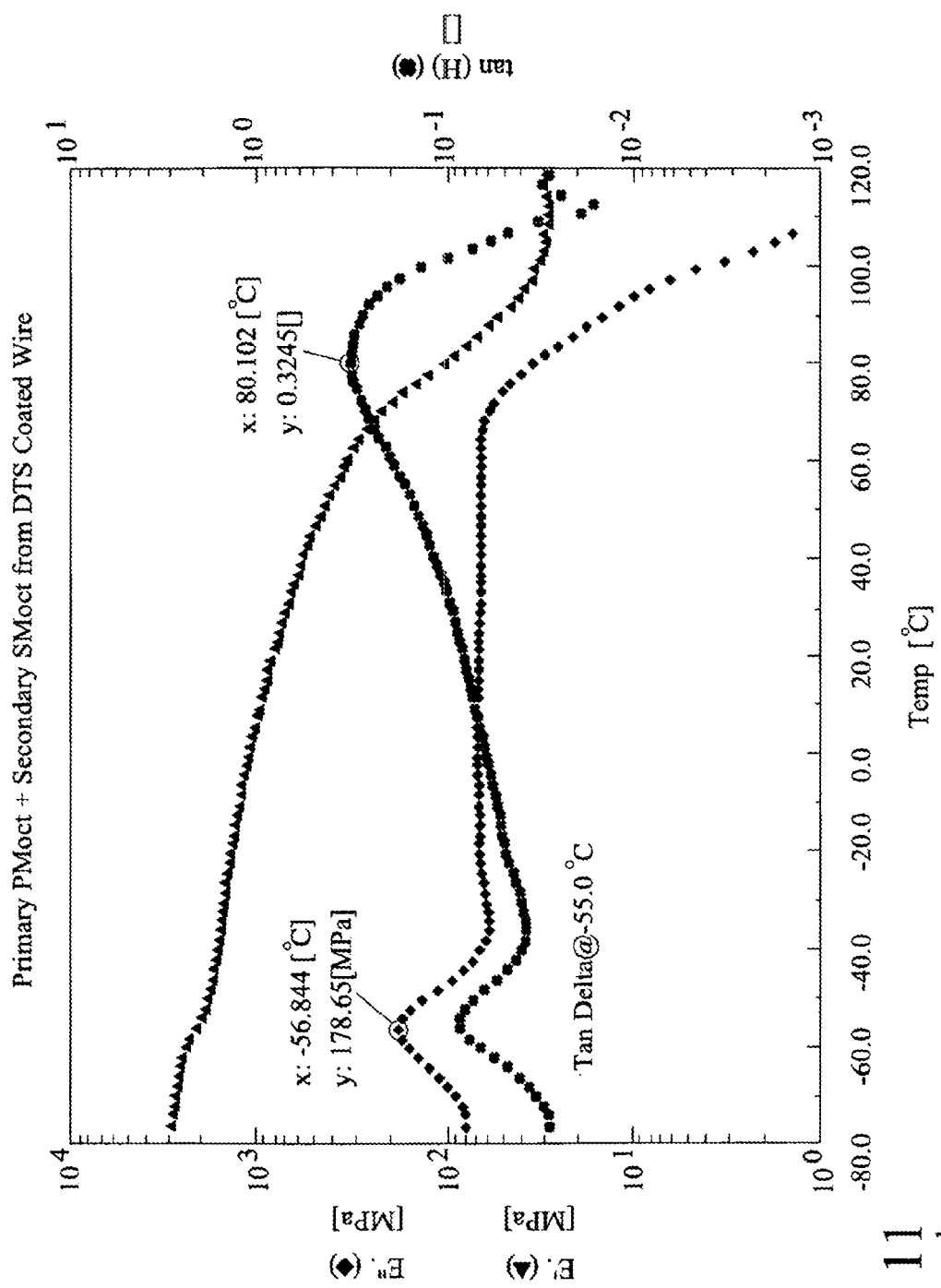
FIG. 11 is a DMA plot of a Tube of Secondary PMoct, Supercoatings Candidate over Primary PMoct Supercoatings as put on wire using the Draw Tower Simulator; this is a Comparative Example, not an Example of the Instant Claimed Test Method.
Figure 12:
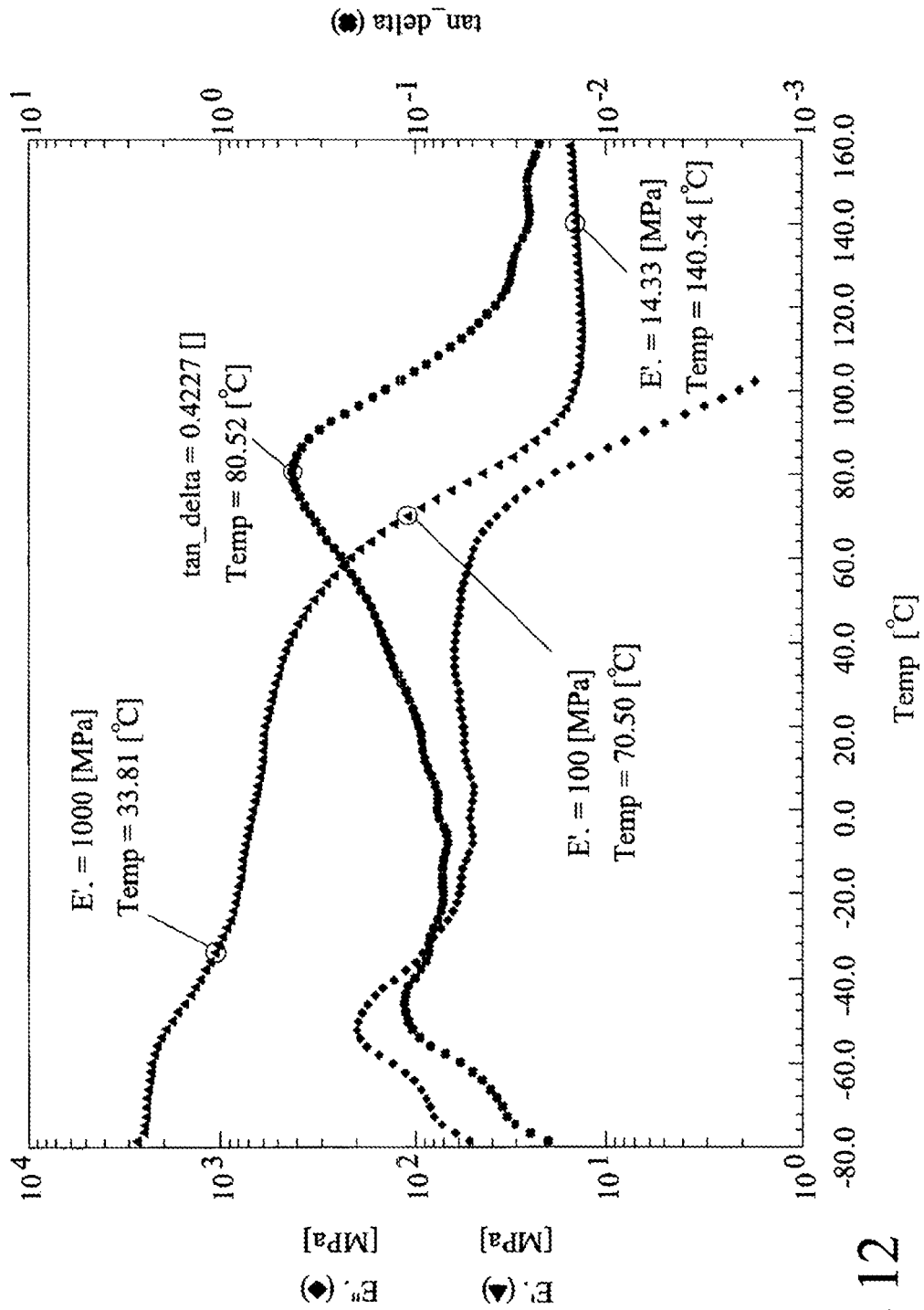
FIG. 12 is a Dynamic Mechanical Analysis ("DMA") plot of composite film of PMoct Primary (Example 1PB3) covered by PMoct Secondary (Example 2SB3) applied Wet-on-Wet (abbreviated W-O-W).
Figure 13:
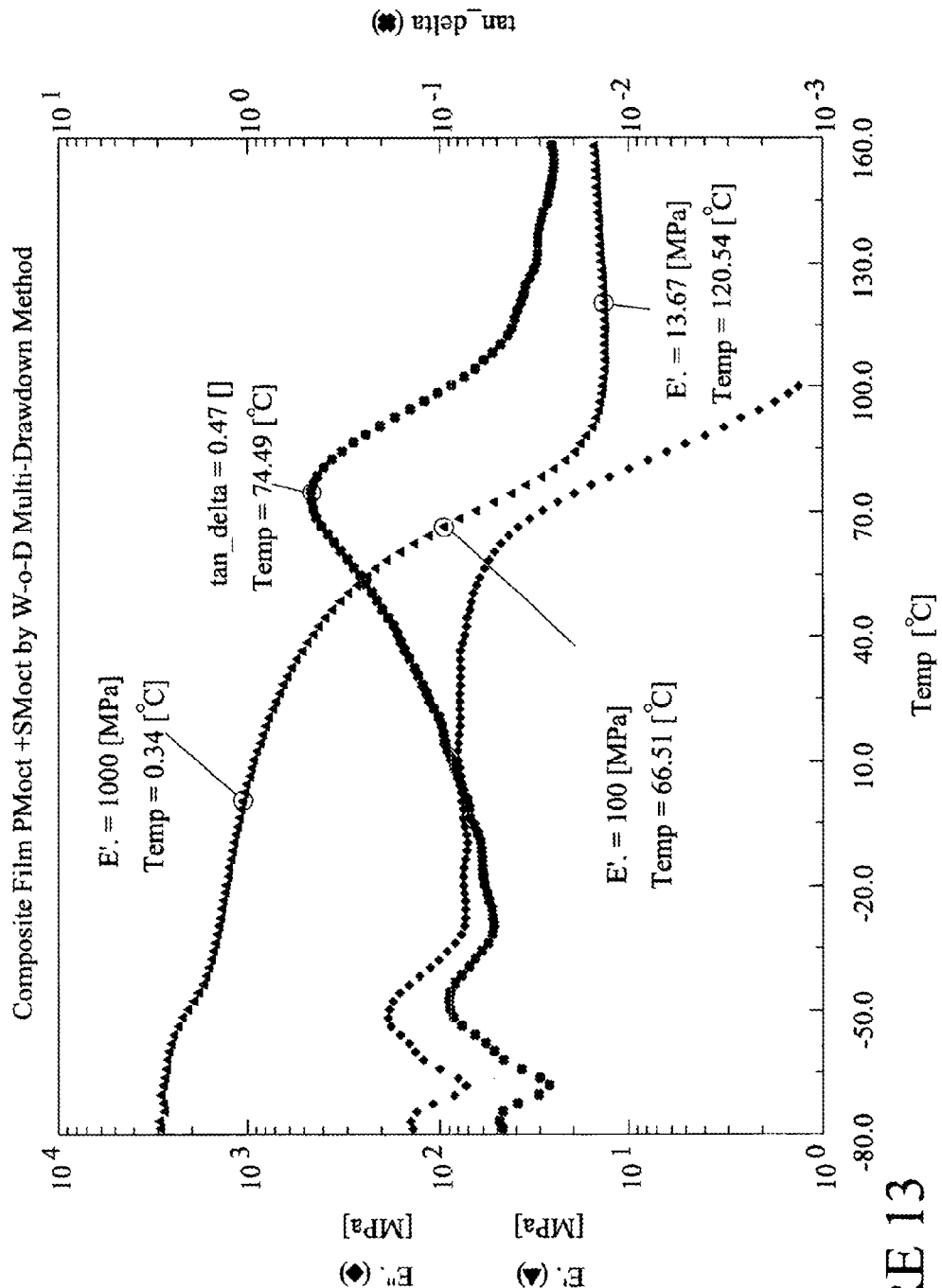
FIG. 13 is a DMA plot of composite film of PMoct Primary (Example 1PB3) covered by PMoct Secondary (Example 2SB3) applied Wet on Dry (abbreviated W-O-D).

The lack of mixing of the layers is further illustrated in FIGS. 7, 8 and 9.

FIG. 7 is Spectra "all", which shows 4 spectra with a comparable appearance to two sets of two sitting on top of each other.

FIG. 8 is Spectra "Brown" showing the colored secondary portion only, and the top of the dual drawdown portion. The two spectra match up quite well.

FIG. 9 is Spectra "formulation Option A for the Supercoatings Primary Layer from Example 3SA3 Color twoH, (Color 2HBrown)" showing the glass side of the dual layer, and the glass side of a single 3 mil Example 3 Supercoatings Primary Layer drawdown. Again the spectra match up very well.

These composite films are then suitable for typical testing related to the properties desirable in Radiation curable Supercoatings intended for optical fiber applications. Testing can include % RAU. This is especially of value when the Secondary layer is being applied wet over a wet Primary Coating Layer and it becomes critical that the cure rate of the Secondary layer is not faster than the cure rate of the Primary Coating layer because if the Secondary Coating cures faster than the primary coating then the Primary Coating may never cure to its desired % RAU because the optical transmission of cured Secondary Coating Layer is typically less than that of liquid, uncured Secondary Coating Layer.

An interesting observation is that with this new Method of Formulating Radiation curable Supercoatings for Optical Fiber it has been possible to formulate Radiation curable Supercoatings with the following enhanced functional Properties:

A % RAU that ranges now to an upper limit of about 100% for both the Primary Coating Layer and the Secondary Coating Layer.

This method permits the investigation of the properties of primary and secondary as a composite Supercoatings film in ways not available in the past. With this method it is now possible to conduct feasibility studies of Supercoatings Candidate Secondary Layers over Supercoatings Candidate Primary Layers for tensile properties, DMA characteristics, environmental durability, etc., with easily handled films instead of having to use the Draw Tower Simulator. There are many understood benefits of using the Multi-layer Film Drawdown method, including, but not limited to the following: the film drawdown takes away the line speed as a factor in coatings functionality to allow for more basic analysis; it also allows the formulator to evaluate the migration of materials from layer to layer during the wet on dry and wet on wet processing steps.

Another advantage of the Multi-Layer Film Drawdown method is that it is critical for both wet on wet processing and wet on dry processing that sufficient through cure is possible to cure the primary coating to the requisite percentage RAU when the coating is applied to wire or optical fiber. In practice, it is known that in Wet on dry processing, the primary coating may be undercured to achieve line speed with the expectations that the cure will be finished in the primary coating when the radiation is applied to the secondary coating. Therefore use of the Multi-Layer Film Drawdown method is helpful to simulate wet on wet application as compared to wet on dry application and testing the % RAU to determination of cure of primary through the secondary. The simulation allows the formulator to quickly evaluate the efficacy of different photoinitiators. This testing has already led to the hypothesis that for Radiation Curable Supercoatings for Optical Fiber, to achieve the very high levels of % RAU that are desired and required, it is believed, without intending to be bound thereby, to be better to have a different chemical type of photoinitiator in the Secondary Coating layer than in the Primary Coating layer.

In this way, there will be two different photo initiated reactions taking place in the layers, rather than having one photoinitiator try to achieve the desired level of cure in both layers.

Another benefit of the Multi-layer film drawdown method is approximating the composite behavior of the cured secondary coating layer over the cured primary coating that can be correlated with Primary and Secondary characteristics that can be defined in SUPERCOATINGS. It is possible to evaluate the functional properties of each coating layer by analyzing film using solid film theology testing, otherwise known as DMA (dynamic Mechanical Analysis)

The conclusion is that there is very little intermixing during the dual drawdown process, and that the method is useful in evaluating candidates for Supercoatings Primary Coating Layers and Supercoatings Secondary Coating Layers.

The following examples further illustrate the invention but, of course, should not be construed as in any way limiting its scope.

EXAMPLES

The ingredients listed in these Examples have the following commercial names, are available from the listed source and have the indicated chemical composition.

| Commercial Name | Supplier | Description |
| --- | --- | --- |
| Ebecryl 3700 | Cytec | Bisphenol A diglycidylether diacrylate |
| Celloxide 2021P | Daicel Chemical | Cycloaliphatic epoxy |
| Eponex 1510 | Hexion | Hydrogenated bisphenol A diglycidylether |
| OXT-101 | Toagosei | 3-ethyl-3-hydroxymethyl-oxetane |
| SR 492 | Sartomer | Propoxylated trimethylolpropane triacrylate |
| Pluracol GP430 | BASF | Propoxylated glycerol (polyether triol) |
| Silwet L-7600 | Momentive | Polyalkyleneoxide modified polydimethylsiloxane |
| BYK-A-501 | BYK-Chemie | silicone-free solution of foam destroying polymers |
| Irganox 1035 | Ciba | Hindered phenol antioxidant |
| PRINT Blue 15DT7083 | The Flint Group | Phthalocyanine Blue pigment |
| Hostaperm Violet RL, Pigment Violet 23 | Clariant | Carbozole Violet pigment |
| IRGACURE 184 | Ciba | 1-hydroxycyclohexyl phenyl ketone, free radical photoinitiator |
| Chivacure-1176 | Chitec | mixture of triarylsulfonium hexafluoroantimonate salts, cationic photoinitiator |
| BR-543 | Bomar Specialties | Aliphatic urethane diacrylate oligomer |
| SR 344 | Sartomer | Polyethylene glycol (400) diacrylate (MW 508) |
| SR 504D | Sartomer | Ethoxylated(4) Nonylphenol acrylate (MW 450) |
| SR 531 | Sartomer | Cyclic trimethylolpropane formal acrylate (MW 200) |
| SR 395 | Sartomer | Isodecyl acrylate (MW 192) |
| Irgacure 651 | Ciba | α,α-dimethoxy-alpha-phenylacetophenone free radical photoinitiator |
| Vinyl Caprolactam | BASF | Vinyl amide |

| Abbreviation | Meaning |
| --- | --- |
| BHT | 2,6-di-tert-butyl-4-methylphenol, available from Fitz Chem. |
| CN-120Z | epoxy diacrylate, available from Sartomer. |
| DABCO | 1,4-diazabicyclo[2.2.2]octane, available from Air Products. |
| DBTDL | dibutyl tin dilaurate, available from OMG Americas. |
| HEA | hydroxyethyl acrylate, available from BASF |
| HHPA | hexahydrophthalic anhydride, available from Milliken Chemical. |
| SR-506 | isobornyl Acrylate, available as from Sartomer. |
| Photomer 4066 | ethoxylated nonylphenol acrylate, available from Cognis. |
| Pluracol 1010 | polypropylene glycol (MW = 1000), available from BASF; |
| SR-306HP | tripropylene glycol diacrylate (TPGDA), available from Sartomer. |
| SR-349 | ethoxylated bisphenol A diacrylate, available from Sartomer. |
| Mondur ® TDS Grade II | Monomeric toluene diisocyanate (TDI); a high 2,4-isomer TDI; NCO weight 48%, viscosity 3 mPa · s@25° C., equivalent weight 87.5; functionality 2; available from Bayer |
| TDI | An 80/20 blend of the 2,4- and 2,6-isomer of toluene diisocyanate, available from BASF |
| IPDI | Isophorone diisocyanate, available from Bayer |
| TPO | 2,4,6-trimethylbenzoyldiphenylphosphine oxide type photoinitiator, available from Chitech. |

The present invention is further illustrated with a number of examples.

In all of these examples, the process is as follows:

Step One: determining the maximum Acceptable Increase in Attenuation requirements for the telecommunications network where the optical fiber will be installed;

Step Two: determining the Field Application Environment of the Supercoatings by understanding the:

i) type of glass being used in the optical fiber;

ii) whether the Supercoatings Secondary Layer will be applied over the Supercoatings Primary Layer wet on dry or wet on wet;

iii) the type, number of lights and positioning of lights along the draw tower manufacturing line that are used to cure the Supercoatings on the optical fiber; and iv) the line speed at which the Supercoatings will be applied;

Step Three: using a Three-Dimensional Laced Methodology of
i) Evaluation of candidate Radiation curable Supercoatings by evaluation of the Radiation curable Supercoatings Primary Layer and Secondary Layer for the Six defined Radiation curable Supercoatings parameters;
ii) Testing the Radiation curable Supercoatings Primary Layer and the Secondary Layer to determine if the required functional property(s) of Supercoatings are achieved;
wherein if the required functional property of Supercoatings has not been achieved, reformulating either or both of the Primary or Secondary coating;
iii) testing the reformulated Primary or Secondary Coating to determine if the desired functional property is achieved;
wherein if the desired functional property is achieved then proceeding to step d);
wherein if the desired functional property is not achieved, then repeat steps ii) and iii) until the desired functional property is achieved; and then
Step Four: integrating the effects of reformulation of the Supercoatings Primary Coating Layer and the Supercoatings Secondary Coating Layer by evaluating the change in the formulation relative to all the other defined functional property requirements of Supercoatings; and
Step Five: using the results from the Three-Dimensional Laced Methodology to finalize the selection of Supercoatings to provide the properties required to achieve the Maximum Acceptable Increase in Attenuation of the coated optical fiber.

Example 1

Request for Supercoatings for Microbeading Resistant Single Mode Optical Fiber

An optical fiber manufacturer wishes to apply a radiation curable Supercoatings to their Single Mode Optical Fiber.

The glass used in this Single Mode Optical Fiber is of the most modern type, able to resist Microbending.

Step One:

The requested Microbending Sensitivity for optical fiber used in this network is reported at:
dB/Km of less than about 0.06 at 1310 nm and −60° C.;
dB/Km of less than about 0.11 at 1550 nm and −60° C.; and
dB/Km of less than about 0.15 at 1625 nm and −60° C.

Step Two

Commercial Fiber Data

The radiation curable Radiation curable Supercoatings is applied Wet on Dry.

The curing lights available are: 600w/10 inch D Lamps.

The number of curing lights are: 2 in the primary area and 4 after the secondary coating is applied-possibly up to 5 if needed.

The line speed at which the Supercoatings will be applied is about 1400 m/minute.

Step Three-Formulating Supercoatings

Four different formulators are given the task of working on potential Primary Coating Layers for this radiation curable Supercoatings.

Each Primary Coating Formulator selects the raw materials for their starting Oligomer, then the photoinitiator(s), antioxidant, one or more diluent monomers and other additives based on information available. In general, without intending to be bound thereby, the oligomer synthesis is carried out as follows:

Oligomers suitable for coating compositions of the invention are prepared by reaction of at least one polyether polyol, at least one diisocyanate, at least one hydroxyl terminated acrylate or (meth)acrylate, and optionally an alcohol. The following oligomer synthesis methods illustrate two different methods for synthesizing the oligomer. However, it will be appreciated by the skilled artisan that other synthesis methods also can be used so long as the oligomer comprises a urethane-backbone, with at least one terminal unsaturated group such as an alkenyl group or vinyl group.

Oligomer Synthesis—Method A is also known as an "outside-in" method that first reacts the isocyanate with hydroxyl terminated acrylate or methacrylate, followed by the reaction with polyol.

To a mixture of diisocyanate and inhibitor, HEA is added in a controlled manner so that the temperature does not exceed 40° C. The mixture is allowed to react at 40° C. for 2 h so that the desired NCO content is reached. Polyol and catalyst are then added, and the mixture is allowed to react at 80° C. for 2 h or longer, until the NCO content is not greater than 0.10.

Oligomer Synthesis—Method B is also known as an "inside-out" method that first reacts the isocyanate with polyol, followed by the reaction with hydroxyl terminated acrylate or methacrylate.

Catalyst is added to a mixture of diisocyanate, polyol and inhibitor. The mixture is allowed to react at 60° C. for 2 h, so that the desired NCO content is reached. Then, HEA is added, and the mixture is allowed to react at 85° C. for 1 h or longer, until the NCO content is not greater than 0.05.

Polyether polyols suitable for preparing oligomers in accordance with the invention preferably are selected from the group consisting of a polyethylene glycol and a polypropylene glycol. In an embodiment, the polyether polyol is a polypropylene glycol.

Catalysts for synthesizing urethane based oligomers for use in radiation curable coatings for optical fiber are known in the art. The catalyst is selected from the group consisting of copper naphthenate, cobalt naphthenate, zinc naphthenate, triethylamine, triethylenediamine, 2-methyltriethyleneamine, dibutyl tin dilaurate (DBTDL); metal carboxylates, including, but not limited to: organobismuth catalysts such as bismuth neodecanoate, CAS 34364-26-6; zinc neodecanoete, CAS 27253-29-8; zirconium neodecanoate, CAS 39049-04-2; and zinc 2-ethylhexanoate, CAS 136.53-8; sulfonic acids, including but not limited to dodecylbenzene sulfonic acid, CAS 27176-87-0; and methane sulfonic acid, CAS 75-75-2; amino or organo-base catalysts, including, but not limited to: 1,2-dimethylimidazole, CAS 1739-84-0; and diazabicyclo[2.2.2]octane (DABCO), CAS 280-57-9 (strong base); and triphenyl phosphine; alkoxides of zirconium and titanium, including, but not limited to zirconium butoxide, (tetrabutyl zirconate) CAS 1071-76-7; and titanium butoxide, (tetrabutyl titanate) CAS 5593-70-4; and ionic liquid phosphonium, imidazolium, and pyridinium salts, such as, but not limited to, trihexyl(tetradecyl)phosphonium hexafluorophosphate, CAS No. 374683-44-0; 1-butyl-3-methylimidazolium acetate, CAS No. 284049-75-8; and N-butyl-4-methylpyridinium chloride, CAS No. 125652-55-3; and tetradecyl(trihexyl)phosphonium.

All of these catalysts are commercially available.

In an embodiment, the catalyst is DBTDL or is an organobismuth catalyst such as "COSCAT 83" proprietary organobismuth catalyst, available from CosChem.

The choice of Photoinitiator is determined by:
1) the radiation source, intensity, proximity to the coating
2) the coating layer thickness,
3) whether the formulation is clear or whether the formulation contains pigments, and if "pigment-containing" the type of pigment and the amount of pigment present in the formulation.
4) the types of oligomers present in the composition
5) whether the coating composition is the Primary or Secondary coating layer, and whether the Secondary Coating Layer is applied wet-on-wet or wet-on-dry.

There are two general classes of photoinitiators:
Type I: photoinitiators undergo a uni-molecular bond cleavage upon irradiation to yield free radicals
Type II: photoinitiators undergo a bimolecular reaction where the excited state of the photoinitiator interacts with a second molecule (a co-initiator) to generate free radicals.

UV photoinitiators of both Type I and Type II are available.

Two different formulators are given the task of working on potential Secondary Coating Layers for this radiation curable Supercoatings.

Each Secondary Coating Formulator selects the raw materials for their starting Oligomer, then the photoinitiator(s), antioxidant, one or more diluent monomers and other additives based on information available.

In selecting their raw materials, each Secondary Coating Formulator takes into account the following: TDI Type II is inexpensive, and is a fast reacting isocyanate. Further to the selection of TDI Type II for use in Secondary Coatings, group contribution theory (takes the characteristics of each part of the group and contributes) teaches that the aromatic group in the isocyanate contributes to high Tg and high modulus in the secondary, which is a technical reason why aromatic isocyanates would be favored for secondary coatings.

BHT Food Grade: Antioxidant scavenges free radicals (which is important because HEA (inhibited by methyl hydroquinone) can self-polymerize); therefore a synthetic chemist plans the synthesis to have the BHT in the reaction mixture before the HEA The scavenging reaction also requires the presence of oxygen-it is known that the oxygen in normal ambient air is typically sufficient for this purpose.

2-HEA (2-hydroxy ethyl acrylate) is a simple acrylate which historically has yielded very good cure rates in formulated radiation curable coatings for optical fiber. HBA (hydroxy butyl acrylate) or HPA (hydroxyl ethyl acrylate) are known to be not as reactive in the synthesis.

Both the Primary Coating Formulators and the Secondary Coating Formulators are aware of the following as they formulate; the polymerization of the secondary coating layer causes shrinkage of that layer and the shrinkage of the secondary coating layer puts pressure on the primary coating layer, whether the primary coating layer is already cured or is in the process of being cured when the secondary coating layer is being cured. Stress relaxation is a measure of the relief of stress on the primary caused by the shrinkage of the secondary coating as the secondary coating polymerizes. The temperature of the polymerization of the Secondary Coating Layer of a Supercoating has to be above the Tg for fast relief of that shrinkage. In formulating radiation Curable Supercoatings for Optical Fiber, it is assumed that the temperature of the polymerization of both the Primary and Secondary coating layer is well above their Tg's. If the polymerization temperature is below Tg, the stress relaxation is not as fast. If stress relaxation does not timely occur, the stress on the optical fiber can lead to unacceptable attenuation.

Wet on Wet processing has the potential for additional stress relaxation issues only because the fiber is being coated with two liquids before any polymerization occurs and both liquids are potentially cooler than the fiber, then there will be simultaneous polymerization taking place with dual heats of polymerization so as the curing takes place the temperature profile is uneven between the coating layers. Again, the formulators have to be aware of the fact that with the polymerization taking place simultaneously the difference in cross-link density is also a huge factor as there is much less cross-link-density in the primary coating as there is the secondary.

In the field of optical fiber manufacture it is known that the fiber cabler desires that the optical fiber is in a relaxed state before the optical fiber is manipulated further during the cabling process.

Thus, all formulators have to be aware that minimizing stress relaxation issues is critical, otherwise, the cabling operation will take longer as the cabler has to wait longer after the coatings are applied to the optical fiber to cable the optical fiber to allow for more stress relaxation to occur. It is known if the formulators misformulate such that the primary coating layer and the secondary coating layer don't relax properly and timely, it will be very, very difficult for the cabled optical fiber to not exceed the you never achieve the Maximum Acceptable lucrease in Attenuation.

To enhance stress relaxation the formulators select materials that are more flexible in the secondary coating; however, these flexible materials must be selected in such a way that the additional flexibility does not negatively interfere with targeted physical properties of high Tg and high strength.

Examples 1-4

These Examples illustrate Formulator Alpha's candidate formulations for the candidate Primary Coating Layer of the Supercoatings.

| Material Description | Example 1PA1 wt. % | Example 1PA2 wt. % | Example 1PA3 wt. % | Example 1PA4 wt. % |
| --- | --- | --- | --- | --- |
| Oligomer | | | | |
| ACCLAIM polyol 4200 | 53.03 | 51.68 | 53.03 | 53.03 |
| 2,6-di-tert-butyl-p-cresol | 0.09 | 0.09 | 0.09 | 0.09 |
| IPDI | 4.73 | 4.76 | 4.73 | 4.73 |
| dibutyl tin dilaurate | 0.03 | 0.03 | 0.0 | 0.03 |
| zinc neodecanoate | 0.0 | 0.0 | 0.03 | 0.0 |
| dodecylbenzene sulfonic acid | 0.0 | 0.0 | 0.00 | 0.0 |
| 2-HEA | 1.72 | 1.94 | 1.72 | 1.72 |
| Total Oligomer wt. % | 59.60 | 58.50 | 59.60 | 59.60 |
| IRGACURE 819 | 1.50 | 1.50 | 1.50 | 2.00 |
| IRGANOX 1035 | 0.60 | 0.60 | 0.60 | 0.60 |
| TINUVIN 123 | 0.10 | 0.10 | 0.10 | 0.10 |
| ethoxylated nonyl phenol acrylate | 26.45 | 34.05 | 26.45 | 26.10 |
| SR 349D Monomer | 1.50 | 1.00 | 1.50 | 1.50 |
| SR 339C (PEA) | 9.00 | 3.00 | 9.00 | 9.00 |
| THIOCURE TMPMP | 0.75 | 0.75 | 0.75 | 0.6 |
| A-189 | 0.50 | 0.50 | 0.50 | 0.50 |
| Total (due to rounding of significant figures may be +/−0.10 wt. %) | 100.00 | 100.00 | 100.00 | 100.00 |

Examples 1PB1-1PB4

These Examples illustrate Formulator Beta's candidate formulations for the Primary Coating Layer of the Supercoatings

| Material Description | Example 1PB1 wt. % | Example 1PB2 wt. % | Example 1PB3 wt. % | Example 1B4 wt. % |
|---|---|---|---|---|
| Oligomer | | | | |
| ACCLAIM polyol 4200 | 45.78 | 45.78 | 45.78 | 45.78 |
| acrylic acid, 99% | 0.01 | 0.01 | 0.01 | 0.01 |
| BHT | 0.04 | 0.04 | 0.04 | 0.04 |
| Mondur TDS Grade II | 2.92 | 2.92 | 2.92 | 2.92 |
| dibutyltin dilaurate | 0.0 | 0.0 | 0.02 | 0.02 |
| zinc neodecanoate | 0.02 | 0.0 | 0.0 | 0.0 |
| dodecylbenzene sulfonic acid | 0.0 | 0.02 | 0.0 | 0.0 |
| 2-HEA | 1.24 | 1.24 | 1.24 | 1.24 |
| Total Oligomer wt. % | 50.01 | 50.01 | 50.01 | 50.01 |
| IRGANOX 1035 | 0.50 | 0.50 | 0.50 | 0.50 |
| SR-504D | 46.29 | 46.29 | 46.29 | 46.29 |
| SR 349D | 0.91 | 0.91 | 0.91 | 0.91 |
| TINUVIN 123 | 0.10 | 0.10 | 0.10 | 0.10 |
| IRGACURE 819 | 1.20 | 1.20 | 1.20 | 0.0 |
| TPO | 0.0 | 0.0 | 0.0 | 1.20 |
| A-189 | 0.99 | 0.99 | 0.99 | 0.99 |
| Total (due to rounding of significant figures may be +/−0.10 wt. %) | 100.00 | 100.00 | 100.00 | 100.00 |

Examples 1PC1 Through 1PC4

These Examples illustrate Formulator Gamma's candidate formulations for the Primary Coating Layer of the Supercoatings.

| Material Description | Example 1PC1 wt. % | Example 1PC2 wt. % | Example 1PC3 wt. % | Example 1PC4 wt. % |
|---|---|---|---|---|
| Oligomer | | | | |
| ACCLAIM polyol 4200 | 57.47 | 57.44 | 57.44 | 57.18 |
| BHT | 0.1 | 0.1 | 0.1 | 0.1 |
| IPDI | 5.25 | 5.25 | 5.25 | 5.25 |
| dibutyltin dilaurate | 0.03 | 0.03 | 0.03 | 0.03 |
| zinc neodecanoate | 0.0 | 0.03 | 0.0 | 0.15 |
| dodecylbenzene sulfonic acid | 0.0 | 0.0 | 0.03 | 0.15 |
| 2-HEA | 2.15 | 2.15 | 2.15 | 2.14 |
| Total Oligomer wt. % | 65.00 | 65.00 | 65.00 | 65.00 |
| SR-504D | 21.55 | 21.55 | 21.55 | 21.55 |
| SR 339C | 9 | 9 | 9 | 9 |
| SR 349D | 1 | 1 | 1 | 1 |
| IRGACURE 819 | 1.5 | 0.0 | 0.75 | 0.5 |
| TPO | 0.0 | 1.5 | 0.75 | 1.00 |
| IRGANOX 1035 | 0.6 | 0.6 | 0.6 | 0.6 |
| TINUVIN 123 | 0.1 | 0.1 | 0.1 | 0.1 |
| A-189 | 1.25 | 1.25 | 1.25 | 1.25 |
| Total (due to rounding of significant figures may be +/−0.10 wt. %) | 100.00 | 100.00 | 100.00 | 100.00 |

Examples 2SA1-2SA5 illustrate Formulator Episilon's candidate formulations for the Secondary Coating Layer

| Secondary Material Description | Ex. 2SA1 Wt. % | Ex. 2SA2 Wt. % | Ex. 2SA3 Wt. % | Ex. 2SA4 Wt. % | Ex. 2SA5 Wt. % |
|---|---|---|---|---|---|
| Oligomer OligMT* | 29.95 | | | | |
| Oligomer OligTT** | | 29.95 | | 28.78 | 29.95 |
| Oligomer OligWT*** | | | 29.95 | | |
| Oligomer Wt. % of total formula | 29.95 | 29.95 | 29.95 | 28.78 | 29.95 |
| CN110 | 39.85 | 39.85 | 39.85 | 38.42 | 39.85 |
| SR-506A | 7.4 | 7.4 | 7.4 | 7.2 | 7.4 |
| SR 339C(PEA) | 8.4 | 8.4 | 8.4 | 8.15 | 8.4 |
| SR 306F(TPGDA) | 5.9 | 5.9 | 5.9 | 5.76 | 5.9 |
| SR 238 MONOMER CPI-6992 | 4.5 | 4.5 | 4.5 | 4.27 | 4.5 |
| SARBOX SB520E35 | | | | 2.43 | |
| TPO HP | 1 | | 1 | 1 | |
| Irgacure 819 | | 1 | | 0 | 1 |
| 1-Hydroxycyclohexyl-Phenyl Ketone | 2 | 2 | 2 | 3 | 2 |
| IRGANOX 1035 FF(W&C) | 0.5 | 0.5 | 0.5 | 0.5 | 0.5 |
| DC-190 Surfactant | 0.33 | 0.33 | 0.33 | 0.33 | 0.33 |
| DC-57 Additive | 0.17 | 0.17 | 0.17 | 0.17 | 0.17 |
| Total (due to rounding of significant figures may be +/−0.10 wt. %) | 100 | 100 | 100 | 100 | 100 |

| | *Oligomer OligMT | **Oligomer OligTT | ***Oligomer OligWT |
|---|---|---|---|
| TDI Type II | 22.47 | 21.26 | 22.32 |
| BHT Food Grade | 0.07 | 0.05 | 0.05 |
| 2-HEA | 13.99 | 14.18 | 16.08 |
| Dibutyltin Dilaurate | 0.07 | 0.05 | 0.05 |
| Pluracol P1010 | 63.41 | 64.46 | 61.50 |
| Total (due to rounding of significant figures may be +/−0.10 wt. %) | 100 | 100 | 100 |

Examples 2SB1-2SB4

These Examples illustrate Formulator Zeta's Candidate formulations for the Secondary Coating Layer of the Supercoatings

| Secondary Material description | Ex. 2SB1 Wt. % | Ex. 2SB2 Wt. % | Ex. 2SB3 Wt. % | Ex. 2SB4 Wt. % | Ex. 2SB5 Wt. % |
|---|---|---|---|---|---|
| Oligomer OligMT* | 30.00 | 24.60 | | | |
| Oligomer OligTT** | | | 30.00 | 27.80 | |
| Oligomer OligWT*** | | | | | 30.00 |
| Oligomer Wt. % of total formula | 30.00 | 24.60 | 30.00 | 27.80 | 30.00 |
| CN120Z | 40.00 | 45.40 | 40.00 | 42.20 | 40.00 |
| SR-506A | 7.5 | 7.5 | 7.5 | 7.5 | 7.5 |
| SR 339C | 8.5 | 8.5 | 8.5 | 8.5 | 8.5 |
| SR 306F | 6 | 6 | 6 | 6 | 6 |
| SR 238 | 4.5 | 4.5 | 4.5 | 4.5 | 4.5 |
| Irganox 1035 FF | 0.5 | 0.5 | 0.5 | 0.5 | 0.5 |
| Irgacure 819 | 0.0 | 0.0 | 0.0 | 0.0 | 0.0 |
| TPO HP | 0.5 | 0.5 | 0.5 | 0.5 | 0.5 |
| 1-Hydroxycyclohexyl-Phenyl Ketone | 2 | 2 | 2 | 2 | 2 |
| DC-190 Surfactant | 0.33 | 0.33 | 0.33 | 0.33 | 0.33 |
| DC-57 Additive | 0.17 | 0.17 | 0.17 | 0.17 | 0.17 |
| Total (due to rounding of significant figures may be +/−0.10 wt. %) | 100 | 100 | 100 | 100 | 100 |

| | *Oligomer OligMT | **Oligomer OligTT | ***Oligomer OligWT |
|---|---|---|---|
| TDI Type II | 22.47 | 21.26 | 22.32 |
| BHT Food Grade | 0.07 | 0.05 | 0.05 |
| 2-HEA | 13.99 | 14.18 | 16.08 |

-continued

| | | | |
|---|---|---|---|
| Dibutyltin Dilaurate | 0.07 | 0.05 | 0.05 |
| Pluracol P1010 | 63.41 | 64.46 | 61.50 |
| Total (due to rounding of significant figures may be +/−0.10 wt. %) | 100 | 100 | 100 |

The results of the Multilayer Film Drawdown analysis show the most compatible potential combinations are:
1PA2 and 2SA4
1PA2 and 2SB3
1PB3 and 2SA4
1PB3 and 2SB3
1PC1 and 2SA4
1PC1 and 2SB3
1PD5 and 2SA4
1PD5 and 2SB3

These combinations are then run on the Draw Tower Simulator.

Certain combinations are found to achieve the properties of a Supercoating at some, but not all, of the line speeds between about 750 m/min and about 2,100 m/min These combinations are found to be Supercoatings at all line speeds:
wherein the composition of the Primary Coating layer, prior to curing, is selected from the group
consisting of the formulations of Examples 1PA2, 1PB3, 1PC1; and
wherein the composition of the Secondary Coating layer, prior to curing, is selected from the group
consisting of the formulations of Examples 2SA4 and 2SB3.

Example 2

An optical fiber manufacturer wishes to save energy costs by switching at least part of their curing lights over to LED lights. They decide to start the switch by changing their lights curing the primary coating to LED lights. Their current primary coating is Example 1PB3 (from Example 1).

The Single Mode Optical Fiber is of the most modern type, able to resist Microbending.

Step One:
The requested Microbending Sensitivity for single mode optical fiber used in this network is reported at:
dB/Km of less than about 0.02 at 1310 nm and −60° C.;
dB/Km of less than about 0.03 at 1550 nm and −60° C.; and
dB/Km of less than about 0.05 at 1625 nm and −60° C.

Step Two
The Single Mode Optical Fiber is of the most modern type, able to resist Microbending
The radiation curable Radiation curable Supercoatings is applied Wet on Dry.

The type of curing lights for the primary coating are: The optical fiber manufacturer wants the flexibility of working with any LED lamp at 395 nm with a power of at least 4 W/cm$^2$.

For purposes of this Example, the LED Lamp chosen is a 8 W/cm$^2$ LED unit with a peak emission at 395 nm. This type of LED lamp is available from Phoseon as an RX Fireline LED unit.

The number of curing lights are: from 1 to 3 in the Primary Coatings area,
The type of curing lights for the secondary coating are: 600 w/10 inch D Lamps
The number of curing lights: 3 in the Secondary Coatings Area
The line speed at which the Supercoatings will be applied is approximately 1300 m/min.

| LED Curable Primary Coatings | | Example 2Alpha LED Curable Version of Example 1PB3 | Example 2Beta LED Curable Version of Example 1PB3 |
|---|---|---|---|
| Components | Description | wt. % | wt. % |
| Acclaim PPG 4200/TDI/HEA | urethane acrylate oligomer | 47.56 | 47.05 |
| Ethoxylated bisphenol A diacrylate | monomer | 0.85 | 0.84 |
| Ethoxylated nonylphenol acrylate | monomer | 44.09 | 43.62 |
| Lucirin TPO-L | 2,4,6-trimethylbenzoyl ethoxy phenyl phosphine oxide | 5.00 | 5.00 |
| Irgacure 819 | bis(2,4,6-trimethylbenzoyl)-phenylphosphineoxide | 1.00 | 2.00 |
| Irganox 1035 | hindered phenol antioxidant | 0.47 | 0.47 |
| Bis-(1-octyloxy-2,2,6,6-tetramethyl-4-piperidinyl) sebacate | light stabilizer | 0.09 | 0.09 |
| A-189 | γ-mercaptopropyl trimethoxy silane | 0.94 | 0.93 |
| Total (due to rounding of significant figures may be +/−0.10 wt. %) | | 100.00 | 100.00 |

| Ingredients in Acclaim PPG 4200/TDI/HEA Oligomer | Wt. % |
|---|---|
| ACCLAIM polyol 4200 | 91.54 |
| acrylic acid, 99% | 0.02 |
| BHT | 0.08 |
| Mondur TDS Grade II | 5.83 |
| dibutyltin dilaurate | 0.05 |
| 2-HEA | 2.48 |
| Total (due to rounding of significant figures may be +/−0.10 wt. %) | 100.00 |

Therefore the fourth aspect of the instant claimed invention is a single-mode optical fiber coated with Supercoatings, wherein said Supercoatings comprise, Primary Coating Layer and a Secondary Coating Layer,
wherein the composition of the Primary Coating layer, prior to curing, is selected from the group consisting of the formulations of Examples 1PA2, 1PB3, 1PC1, 2Alpha, 2Beta; and wherein the composition of the Secondary Coating layer, prior to curing, is selected from the group consisting of the formulations of Examples 2SA4 and 2SB3 and 5SA1.

Example 3

An optical fiber manufacturer—wishes to apply a radiation curable Supercoatings for their Single Mode Optical Fiber. The Single Mode Optical Fiber is of the most modern type, able to resist Microbending.

Step One:
The requested Microbending Sensitivity for single mode optical fiber used in this network is reported at:
dB/Km of less than about 0.02 at 1310 nm and −60° C.;
dB/Km of less than about 0.06 at 1550 nm and −60° C.; and
dB/Km of less than about 0.09 at 1625 nm and −60° C.

Step Two
The Single Mode Optical Fiber is of the most modern type, able to resist Microbending
The radiation curable Radiation curable Supercoatings is applied Wet on Wet.
The Secondary Coating is a Colored Secondary, wherein the clear Secondary Base Coat is mixed in line with a Color Concentrate.
The type of curing lights are: Proprietary Lamps with a metal halide spectrum similar to Fusion D lamps
The number of curing lights is: 3 lamps/20 inch.
The line speed at which the Supercoatings will be applied is approximately 1700 meters/minute.

Step Three
Step Three-Formulating Supercoatings

For the Primary Coating Layer an Oligomer is selected, along with a photoinitiator, antioxidant, two diluent monomers and other additives based on information available. For the Secondary Coating Layer an Oligomer Blend is selected, along with a photoinitiator, antioxidant, two diluent monomers and other additives based on information available to formulate a Clear Secondary Coating. Colorants are formulated to add to the Clear Secondary Coating during in-line mixing. In addition to running the Primary coating and Secondary coating on the Draw tower Simulator operating at 1625 meters/minute, the Multilayer Film DrawDown test method is used to create Supercoatings Film of a Primary Coating Layer with an overcoat of Clear Secondary Coating Layer. The film is removed from the substrate and tested for the properties in Supercoatings.

In addition to using the Multilayer Film DrawDown test method to create Supercoatings Film of a Primary Coating Layer with an overcoat of Clear Secondary Coating Layer, a Multilayer Film DrawDown is made of a Primary Coating Layer and a Colored Secondary made of the Clear Secondary Coating and Colorant.

| Candidate Primary Coatings Material description | Example 3PA1 Weight Percent | Example 3PA2 Weight Percent | Example 3PA3 Weight Percent | Example 3PA4 Weight Percent |
|---|---|---|---|---|
| Acclaim polyol 4200 | 57.63 | 57.63 | 57.63 | 57.63 |
| BHT Food Grade | 0.1 | 0.1 | 0.1 | 0.1 |
| IPDI | 5.12 | 5.12 | 5.12 | 5.12 |
| Dibutyltin Dilaurate | 0.03 | 0.03 | 0.03 | 0.03 |
| zinc neodecanoate | | 0.03 | | 0.15 |
| dodecylbenzene sulfonic acid | | | 0.03 | 0.15 |
| 2-HEA | 2.12 | 2.09 | 2.09 | 1.82 |
| Oligomer Wt. % of total formula | 65.00 | 65.00 | 65.00 | 65.00 |
| SR-504D | 21.55 | 21.55 | 21.55 | 21.55 |
| SR 339C | 9 | 9 | 9 | 9 |
| SR 349D Monomer | 1 | 1 | 1 | 1 |
| Irgacure 819 | 1.5 | | 0.75 | 0.5 |
| TPO | | 1.5 | 0.75 | 1 |
| IRGANOX 1035 FF(W&C) | 0.6 | 0.6 | 0.6 | 0.6 |
| TINUVIN 123 | 0.1 | 0.1 | 0.1 | 0.1 |
| A-189 | 1.25 | 1.25 | 1.25 | 1.25 |
| Total (due to rounding of significant figures may be +/−0.10 wt. %) | 100 | 100 | 100 | 100 |

| | | Example 3SA1 Clear oneH | Example 3SA2 Color oneH | | Example 3SA3 Color twoH | |
|---|---|---|---|---|---|---|
| Candidate Secondary Coating with Optional Color Concentrate Added | | Clear Secondary Coating | Rose | Rose | Brown | Brown |
| | | | Concentrate Weight percent | Secondary Weight percent | Concentrate Weight percent | Secondary Weight percent |
| Clear Base M† | | 100.00 | 90.64 | 75 | 84.4 | 75 |
| White | | | 6.8 | | | |
| Red | | | 1.6 | | 6.8 | |
| Yellow | | | | | 8 | |

|  | Example 3SA1 Clear oneH | Example 3SA2 Color oneH |  | Example 3SA3 Color twoH |  |
|---|---|---|---|---|---|
| Orange |  | 0.96 |  |  |  |
| Black |  |  |  | 0.8 |  |
| Rose colored 2° inter. |  |  | 25 |  |  |
| Brown colored 2° inter. |  |  |  |  | 25 |
| Total (due to rounding of significant figures may be +/−0.10 wt. %) | 100 | 100 | 100 | 100 |  |

Clear Base M†

| Ingredients | Weight % |
|---|---|
| Oligomer M3 ∵ | 20.27 |
| CN120Z | 50.00 |
| TPO | 1.06 |
| Chivacure 184 | 0.80 |
| BHT Food Grade | 0.50 |
| KIP 100 F | 1.06 |
| SR306 MONOMER | 15.00 |
| SR 238 MONOMER | 9.80 |
| SR-504D | 0.50 |
| DC-190 Surfactant | 0.68 |
| DC-57 Additive | 0.33 |
| Total (due to rounding of significant figures may be +/−0.10 wt. %) | 100.00 |

Example 3 Continued

Oligomer M3 ∵ is an Oligomer. The ingredients combined to make Oligomer M3 include the following:

Oligomer M3 ∵

| Material description | Wt. % |
|---|---|
| TDI Type II | 21.26 |
| BHT Food Grade | 0.05 |
| 2-HEA | 14.18 |
| Dibutyltin Dilaurate | 0.05 |
| Pluracol P1010 | 64.46 |
| Total (due to rounding of significant figures may be +/−0.10 wt. %) | 100.00 |

Example 4

An optical fiber manufacturer wishes to apply a radiation curable Supercoatings for their MULTI-Mode Optical Fiber. The MULTI-Mode Optical Fiber is of the most modern type, able to resist Microbending.

Step One:

The requested Microbending Sensitivity for single mode optical fiber used in this network is as of this writing, still under investigation at 850 nm and 1300 nm. As details develop more Microbending Sensitivity testing will be done.

Step Two

The MULTI-Mode Optical Fiber is of the most modern type, able to resist Microbending The radiation curable Secondary Coating is applied Wet on Wet Primary Coating.

The line speed at which the Primary Coating and Secondary Coating will be applied is about 200 meters/minute.

The Secondary Coating is a Clear Secondary.

The type of curing lights are 600 w/D Lamps.

The number of curing lights are: 3 in the Primary Coatings area. 3 in the Secondary Coatings Area Step 3.

For the Primary Coating Layer an Oligomer is selected, along with a photoinitiator, antioxidant, two diluent monomers and other additives based on information available to make a Multi-Mode Coating. For the Secondary Coating Layer an Oligomer Blend is selected, along with a photoinitiator, antioxidant, two diluent monomers and other additives based on information available to formulate a Clear Secondary Coating for Multi-Mode Coating.

Example 4PD1-4PD5

These Examples illustrate Formulator Delta's formulations for the Primary Coating Layer

|  | Example 3SA1 Clear oneH | Example 3SA2 Color oneH |  | Example 3SA3 Color twoH |  |
|---|---|---|---|---|---|
| Candidate Secondary Coating with Optional Color Concentrate Added | Clear Secondary Coating | Rose | Rose | Brown | Brown |
| FILTER TYPE |  | Concentrate | Secondary | Concentrate | Secondary |
| Total Base 2° Resin: | 100.00 |  | 97.66 | 84.40 | 96.10 |
| +Total Colorant: |  | 9.36 | 2.34 | 15.60 | 3.90 |
| @Total Dry Pigment: |  | 4.59 | 1.15 | 3.12 | 0.78 |
| *Photoinitiator %: | 2.92 | 2.65 | 2.85 | 2.46 | 2.81 |

| Material Description | Ex. 4PD1 wt. % | Ex. 4PD2 wt. % | Ex. 4PD3 wt. % | Ex. 4PD4 wt. % | Ex. 4PD5 wt. % |
|---|---|---|---|---|---|
| Oligomer | | | | | |
| 2,4-TDI | 3.6 | 3.43 | 4.34 | 3.53 | 3.38 |
| 2,6-di-tert-butyl-p-cresol | 0.05 | 0.05 | 0.04 | 0.05 | 0.05 |
| acrylic acid | 0.01 | 0.01 | 0.02 | 0.01 | 0.01 |
| 2-HEA | 1.48 | 1.48 | 1.48 | 1.3 | 1.46 |
| ACCLAIM polyol 4200 | 50.41 | 50.10 | 50.00 | 48.17 | 50.10 |
| dibutyl tin dilaurate | 0.03 | 0.03 | 0.03 | 0.03 | 0.03 |
| Total Oligomer wt. % | 55.58 | 55.91 | 55.91 | 53.09 | 55.91 |
| ethoxylated nonyl phenol acrylate | 40.29 | 40.29 | 40.29 | 42.71 | 40.29 |
| SR 349D | 1.2 | 1.50 | 1.50 | 1.7 | 1.50 |
| TPO | 0.9 | 0.0 | 1.60 | 1.7 | 1.70 |
| IRGACURE ® 819 | 0.5 | 1.70 | | 0.5 | |
| IRGANOX 1035 | 1.5 | 0.50 | 0.50 | 0.3 | 0.50 |
| TINUVIN 123 | 0.03 | 0.10 | 0.10 | 0.1 | 0.10 |
| A-189 | 0.90 | 0.9 | 0.80 | 0.90 | 0.90 |
| Total (due to rounding of significant figures may be +/−0.10 wt. %) | 100.00 | 100.00 | 100.00 | 100.00 | 100.00 |

The fifth aspect of the instant claimed invention is a multimode optical fiber coated with radiation curable coatings comprising a Primary Coating Layer and a Secondary Coating Layer wherein the composition of the Primary Coating layer, prior to curing, is selected from the group consisting of the formulation of Example 4PD5; and wherein the composition of the Secondary Coating layer, prior to curing, is selected from the group consisting of the formulations of Examples 2SA4 and 2SB3.

Example 5

This Supercoatings Secondary is formulated from an existing Supercoatings Secondary to meet the needs of a customer that is requesting a product with a higher refractive index to enable them to use installed equipment to ascertain concentricity in their finished coated fiber. The changes from the earlier coating are as follows:

a) include the use of SR-601 at about a 10% level,
b) the use of slightly more TPO, from 0.5% to 0.75%,
c) slightly more Chivacure 184, from 2% to 2.5%,
d) the elimination of IBOA and SR-306, which is replaced by about 15% of PEA.

| Function in Formula | COMPONENT | Example 5SA1 Wt. % in formula | Example 5SA2 Wt. % in formula | Example 5SA3 Wt. % in formula |
|---|---|---|---|---|
| oligomer | Oligomer M3·· | 28.1 | 25.1 | 35.0 |
| epoxy acrylate | CN-110 | 37.4 | 39.4 | 37.4 |
| acrylate monomer | HDDA | 5.2 | 5.2 | 5.2 |
| acrylate monomer | SR-601 | 10.3 | 10.3 | 10.3 |
| acrylate monomer | PEA | 14.75 | 15.75 | 7.85 |
| Photo initator | TPO | 0.75 | 0.75 | 0.75 |
| Photo initiator | Chivacure 184 | 2.5 | 2.5 | 2.5 |
| Stabilizer | Irgacure 1035 | 0.5 | 0.5 | 0.5 |
| silicon surfactant | DC-190 | 0.33 | 0.33 | 0.33 |
| Silicon Surfactant | DC-57 | 0.17 | 0.17 | 0.17 |
| Total (due to rounding of significant figures may be +/−0.10 wt. %) | | 100 | 100 | 100 |

Oligomer M3·· is an Oligomer. The ingredients combined to make Oligomer M3 include the following:

| Oligomer M3·· | |
|---|---|
| Material description | Wt. % |
| TDI Type II | 21.26 |
| BHT Food Grade | 0.05 |
| 2-HEA | 14.18 |
| Dibutyltin Dilaurate | 0.05 |
| Pluracol P1010 | 64.46 |
| Total (due to rounding of significant figures may be +/−0.10 wt. %) | 100.00 |

Example 6

This shows the combination of Primary Coating and Secondary Coating in each of the listed Supercoatings.

| | | Secondary Coating | | |
|---|---|---|---|---|
| Primary Coating | Example 2SA4 | Example 2SB3 | Example 3SA1 | Example 5SA1 |
| Example 1PA2 | Supercoatings 072727 | Supercoatings 013128 | Supercoating 112057 | Supercoatings 081556 |
| Example 1PB3 | Supercoatings 041656 | Supercoatings 062551 | Supercoatings 062752 | Supercoatings 072054 |
| Example 1PC1 | Supercoatings 0416100510 | Supercoatings 062551100510 | Supercoatings 062752100510 | Supercoatings 072054100510 |
| Example 2 Alpha | Supercoatings 072710 | Supercoatings 013110 | Supercoatings 112010 | Supercoatings 081510 |
| Example 2 Beta | Supercoatings 041610 | Supercoatings 062510 | Supercoatings 062710 | Supercoatings 072010 |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

An embodiment embodiments of this invention are described herein, including the best mode known to the inventors for carrying out the invention. Variations of those an embodiment embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of making a multi-mode optical fiber that has a primary coating layer that is in contact with the outer surface of the optical fiber and a secondary coating layer that is in contact with the outer surface of the primary coating layer, the method comprising the steps of:
    forming the primary coating layer by curing a composition comprising:
        55.91 wt. % of an oligomer prepared by reaction of:
        3.38 wt. % of 2,4-toluene diisocyanate,
        0.05 wt. % of 2,6-di-tert-butyl-p-cresol,
        0.01 wt. % of acrylic acid,
        1.46 wt. % of 2-hydroxyethyl acrylate,
        50.10 wt. % of polypropylene glycol, MW=4200, and
        0.03 wt. % of dibutyltin dilaurate;
        40.29 wt. % ethoxylated nonyl phenol acrylate;
        1.50 wt. % of bisphenol A ethoxylate diacrylate;
        1.70 wt. % of 2,4,6-trimethylbenzoyldiphenylphosphine oxide type photoinitiator;
        0.50 wt. % of hindered phenol antioxidant;
        0.10 wt. % of bis(1-octyloxy-2,2,6,6-tetramethyl-4-piperidyl)sebacate; and
        0.90 wt. % of γ-mercaptopropyltrimethoxysilane; and
    forming the secondary coating layer by curing a composition selected from the group of formula compositions (a), (b), (c) and (d) that are defined as follows:
    (a) 28.78 wt. % of an oligomer prepared by reaction of:
        21.26 wt. %, by weight of the oligomer, of an 80/20 blend of the 2,4- and 2,6-isomer of toluene diisocyanate,
        0.05 wt. %, by weight of the oligomer, of 2,6-di-tert-butyl-4-methylphenol,
        14.18 wt. %, by weight of the oligomer, of 2-hydroxyethyl acrylate,
        0.05 wt. %, by weight of the oligomer, of dibutyltin dilaurate, and
        64.46 wt. %, by weight of the oligomer, of polypropylene glycol, MW=1000;
        38.42 wt. % of difunctional bisphenol A-based epoxy acrylate oligomer;
        7.2 wt. % of isobornyl acrylate;
        8.15 wt. % of 2-phenoxyethyl acrylate;
        5.76 wt. % of tripropylene glycol diacrylate;
        4.27 wt. % of 1,6-hexanediol diacrylate;
        2.43 wt. % of a blend, wherein said blend consists essentially of 35 wt. % of aromatic acid acrylate half ester and 65 wt. % of ethoxylated trimethylolpropane triacrylate;
        1 wt. % of 2,4,6-trimethylbenzoyldiphenylphosphine oxide type photoinitiator;
        3 wt. % of 1-hydroxycyclohexyl-phenyl ketone;
        0.5 wt. % of hindered phenol antioxidant;
        0.33 wt. % of a blend, wherein said blend consists essentially of, 40 to 70 wt. % of dimethyl, methyl(propyl (poly(ethylene oxide) (propylene oxide))acetate)siloxane, 30 to 60 wt. % of poly(ethylene oxide propylene oxide) monoallyl ether acetate, and less than 9 wt. % of polyether polyol acetate; and
        0.17 wt. % of dimethyl, methyl(propyl(poly(ethylene oxide))acetate) siloxane;
    (b) 30.00 wt. % of an oligomer prepared by reaction of
        21.26 wt. %, by weight of the oligomer, of an 80/20 blend of the 2,4- and 2,6- isomer of toluene diisocyanate,
        0.05 wt. %, by weight of the oligomer, of 2,6-di-tert-butyl-4-methylphenol,
        14.18 wt. %, by weight of the oligomer, of 2-hydroxyethyl acrylate,
        0.05 wt. %, by weight of the oligomer, of dibutyltin dilaurate, and
        64.46 wt. %, by weight of the oligomer, of polypropylene glycol, MW=1000;
        40.00 wt. % of epoxy diacrylate;
        7.5 wt. % of isobornyl acrylate;
        8.5 wt. % of 2-phenoxyethyl acrylate;
        6 wt. % of tripropylene glycol diacrylate;
        4.5 wt. % of 1,6-hexanediol diacrylate;
        0.5 wt. % of hindered phenol antioxidant;
        0.5 wt. % of 2,4,6-trimethylbenzoyldiphenylphosphine oxide type photoinitiator;
        2 wt. % of 1-hydroxycyclohexyl-phenyl ketone;
        0.33 wt. % of a blend, wherein said blend consists essentially of, 40 to 70 wt. % of dimethyl, methyl(propyl (poly(ethylene oxide) (propylene oxide))acetate)siloxane, 30 to 60 wt. % of poly(ethylene oxide propylene oxide) monoallyl ether acetate, and less than 9 wt. % of polyether polyol acetate; and
        0.17 wt. % of dimethyl, methyl(propyl(poly(ethylene oxide))acetate) siloxane;
    (c) 20.27 wt. % of an oligomer prepared by reaction of:
        21.26 wt. %, by weight of the oligomer, of an 80/20 blend of the 2,4- and 2,6-isomer of toluene diisocyanate,
        0.05 wt. %, by weight of the oligomer, of 2,6-di-tert-butyl-4-methylphenol,
        14.18 wt. %, by weight of the oligomer, of 2-hydroxyethyl acrylate,
        0.05 wt. %, by weight of the oligomer, of dibutyltin dilaurate, and
        64.46 wt. %, by weight of the oligomer, of polypropylene glycol, MW=1000;
        50.00 wt. % of epoxy diacrylate;
        1.06 wt. % of 2,4,6-trimethylbenzoyldiphenylphosphine oxide type photoinitiator;
        0.80 wt. % of 1-hydroxycyclohexyl phenyl ketone;
        0.50 wt. % of 2,6-di-tert-butyl-4-methylphenol;
        1.06 wt. % of a blend, wherein said blend consists essentially of, 70 wt. % of oligo[2-hydroxy-2-methyl- 1-[4

(1-methyl-vinyl)phenyl]propanone] and 30 wt. % of 2-hydroxy-2-methyl-1-phenylpropanone;
15.00 wt. % of tripropylene glycol diacrylate;
9.80 wt. % of 1,6-hexanediol diacrylate;
0.50 wt. % of ethoxylated(4) nonyl phenol acrylate, MW=450;
0.68 wt. % of a blend, wherein said blend consists essentially of, 40 to 70 wt. % of dimethyl, methyl(propyl (poly(ethylene oxide) (propylene oxide))acetate)siloxane, 30 to 60 wt. % of poly(ethylene oxide propylene oxide) monoallyl ether acetate, and less than 9 wt. % of polyether polyol acetate; and
0.33 wt. % of dimethyl, methyl(propyl(poly(ethylene oxide))acetate) siloxane; and
(d) 28.1 wt. % of an oligomer prepared by reaction of:
21.26 wt. %, by weight of the oligomer, of an 80/20 blend of the 2,4- and 2,6-isomer of toluene diisocyanate,
0.05 wt. %, by weight of the oligomer, of 2,6-di-tert-butyl-4-methylphenol,
14.18 wt. %, by weight of the oligomer, of 2-hydroxyethyl acrylate,
0.05 wt. %, by weight of the oligomer, of dibutyltin dilaurate, and
64.46 wt. %, by weight of the oligomer, of polypropylene glycol, MW=1000;
37.4 wt. % of a difunctional bisphenol A-based epoxy acrylate oligomer;
5.2 wt. % of 1,6-hexanediol diacrylate;
10.3 wt. % of ethoxylated 4 bisphenol A diacrylate;
14.75 wt. % of 2-phenoxyethyl acrylate;
0.75 wt. % of 2,4,6-trimethylbenzoyldiphenylphosphine oxide type photoinitiator;
2.5 wt. % of 1-hydroxcyclohexyl phenyl ketone;
0.5 wt. % of hindered phenol antioxidant;
0.33 wt. % of a blend of 40 to 70 wt. % of dimethyl, methyl(propyl(poly(ethylene oxide) (propylene oxide))acetate)siloxane, 30 to 60 wt. % of poly(ethylene oxide propylene oxide) monoallyl ether acetate, and less than 9 wt. % of polyether polyol acetate; and
0.17 wt. % of dimethyl, methyl(propyl(poly(ethylene oxide))acetate) siloxane.

* * * * *